(12) United States Patent
Nakao et al.

(10) Patent No.: US 8,372,375 B2
(45) Date of Patent: Feb. 12, 2013

(54) METHOD OF PRODUCING HIGH-PURITY HYDROGEN

(75) Inventors: Noboru Nakao, Kobe (JP); Takeshi Yamashita, Kobe (JP); Akitoshi Fujisawa, Kobe (JP); Keita Yura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 828 days.

(21) Appl. No.: 11/921,513

(22) PCT Filed: Apr. 25, 2006

(86) PCT No.: PCT/JP2006/308641
§ 371 (c)(1),
(2), (4) Date: Dec. 4, 2007

(87) PCT Pub. No.: WO2006/132040
PCT Pub. Date: Dec. 14, 2006

(65) Prior Publication Data
US 2009/0117030 A1    May 7, 2009

(30) Foreign Application Priority Data

Jun. 7, 2005 (JP) .................. 2005-167206
Jun. 8, 2005 (JP) .................. 2005-168541
Nov. 14, 2005 (JP) .................. 2005-328978
Nov. 14, 2005 (JP) .................. 2005-328979

(51) Int. Cl.
*C01B 3/02* (2006.01)
*C01B 3/22* (2006.01)
*C01B 3/24* (2006.01)
*C01B 3/26* (2006.01)

(52) U.S. Cl. .......... 423/648.1; 95/96; 95/97; 95/98; 95/99; 95/102; 95/140; 423/650; 423/651; 423/652; 423/655

(58) Field of Classification Search .......... 423/644, 423/648.1, 650, 659, 651–654; 95/96–103, 95/139–140
See application file for complete search history.

(56) References Cited

U.S. PATENT DOCUMENTS

| | | | | |
|---|---|---|---|---|
| 4,250,150 A | * | 2/1981 | Karwat et al. | 423/226 |
| 5,112,590 A | * | 5/1992 | Krishnamurthy et al. | 423/418.2 |
| 5,529,763 A | * | 6/1996 | Peng et al. | 423/246 |
| 5,538,706 A | * | 7/1996 | Kapoor et al. | 423/418.2 |

(Continued)

FOREIGN PATENT DOCUMENTS

| | | | |
|---|---|---|---|
| JP | 62273290 A | * | 11/1987 |
| JP | 2001-261306 | | 3/2000 |
| JP | 2002-201005 | | 11/2001 |
| WO | WO/00/59825 | | 4/2000 |

* cited by examiner

OTHER PUBLICATIONS

International Search Report for PCT/JP2006/308641 dated Aug. 8, 2006.

*Primary Examiner* — Wayne Langel
*Assistant Examiner* — Pritesh Darji
(74) *Attorney, Agent, or Firm* — Stites & Harbison, PLLC; Juan Carlos A. Marquez, Esq.; Stephen J. Weyer, Esq.

(57) ABSTRACT

For recovering hydrogen with a high recovery from a reformed gas and contributing to downsizing and cost reduction of facilities, a high-purity hydrogen E is obtained by reforming a reformable raw material A through a reforming unit 1 to yield a hydrogen-rich reformed gas B, compressing the hydrogen-rich reformed gas B with a compressor 2, allowing the compressed gas to pass through a PSA unit 3 to remove unnecessary gases other than carbon monoxide by adsorption, and allowing the resulting gas to pass through a carbon monoxide remover 4 packed with a carbon monoxide adsorbent supporting a copper halide to remove carbon monoxide by adsorption.

25 Claims, 10 Drawing Sheets

METHOD OF PRODUCING HIGH-PURITY HYDROGEN

TECHNICAL FIELD

The present invention relates to a method of producing high-purity hydrogen which is used typically for proton conduction fuel cells such as phosphoric acid fuel cells and solid polymer fuel cells (proton exchange fuel cells). Specifically, it relates to a method of efficiently producing high-purity hydrogen, in which by-produced carbon monoxide, carbon dioxide, water, and unreacted methane are removed in the production of hydrogen as an energy source (fuel) for fuel cells.

BACKGROUND ART

Combined with measures against global warming, a departure from dependency of energy on crude oil has become a world-wide important issue, and efforts to yield practically usable fuel cells using hydrogen gas as an energy source are stepping up not only in European industrialized countries, where efforts for environmental protection have preceded, but also in the United states of America, and Japan and other Asian countries.

A number of studies on methods of producing hydrogen gas used as a fuel for fuel cells has been pursued. Production methods that are most inexpensive and most practicable at present are methods of producing hydrogen gas by reforming, for example, natural gas, liquid petroleum gas (LPG), kerosene, gasoline, methanol, or dimethyl ether as a raw material. Steam reforming is most generally used in methods of producing hydrogen gas by reforming such raw materials, such as a process of producing hydrogen by reforming natural gas. The natural gas mainly contains methane ($CH_4$), and hydrogen is generated by steam reforming through two-stage reactions as follows:

(1) Reforming Reaction

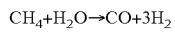

$$CH_4 + H_2O \rightarrow CO + 3H_2$$

(2) Shift Reaction

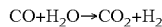

$$CO + H_2O \rightarrow CO_2 + H_2$$

If these reactions ideally proceed, a product contains $H_2$ and $CO_2$ alone. However, a gas after the reforming reaction and shift reaction (hereinafter referred to as "reformed gas") contains steam ($H_2O$), unreacted methane ($CH_4$), carbon monoxide (CO), and carbon dioxide ($CO_2$) in addition to hydrogen ($H_2$), because excessive steam is used in practice from the viewpoint of preventing the formation of carbon due to coking of methane. Fuel hydrogen for fuel cell powered vehicles generally requires a high hydrogen purity of about "five nines" (99.999 percent by volume (hereinafter "percent by volume" is simply referred to as "%")) or more. Particularly, it is believed that a carbon monoxide concentration of the fuel hydrogen must be lowered to 10 ppm or less from the viewpoint of preventing deterioration of platinum (Pt) due to poisoning, which platinum is used as an electrode catalyst in solid polymer fuel cells (proton exchange membrane fuel cells); and the carbon monoxide concentration must further be lowered to about 0.2 ppm or less in consideration of durability of fuel cells.

The following two processes are representative processes of purifying hydrogen from a reformed gas:
(1) a selective oxidation catalyst process; and
(2) a hydrogen pressure swing adsorption (hydrogen PSA) process The selective oxidation catalyst process (1) is a technique which has been developed mainly aiming at stationary fuel cells including domestic-use fuel cells. According to this technique, a reformed gas is added with air or oxygen, CO gas in the reformed gas is selectively oxidized using a catalyst to remove carbon monoxide in the form of $CO_2$ from the reformed gas, and the fuel cell is thus prevented from poisoning by carbon monoxide. This technique is characterized in that it is a process carried out under normal pressure and that it can use a small-sized apparatus because it can be carried out at a relatively high superficial velocity (SV). However, it is difficult to use this technique as a purification technique to yield such a high-purity hydrogen as to be required in on-vehicle fuel cells, because the technique is not a technique of removing $CO_2$, $H_2O$, and $CH_4$ as other impurities than carbon monoxide.

On the other hand, the hydrogen PSA process (2) is a process of removing all $CO_2$, $CH_4$, $H_2O$, and CO from a reformed gas while carrying out pressure swing and using two or more adsorbents such as zeolite, a carbon molecular sieves, and alumina. In addition, hydrogen to be supplied to transportation fuel cells (automotive fuel cells) must be free from not only carbon monoxide but also other impurities, and the hydrogen PSA process is generally employed for producing fuel hydrogen by reforming fossil fuel in hydrogen supply stations.

When hydrogen is purified according to the hydrogen PSA process, impurities other than hydrogen are removed by adsorption under high-pressure to recover a product hydrogen. A PSA adsorbent adsorbing CO, $CH_4$, $H_2O$, and $CO_2$ as impurities is allowed to desorb the adsorbed CO, $CH_4$, $H_2O$, and $CO_2$ by operations of reducing the pressure from a high pressure to normal pressure and washing the adsorbent with the product hydrogen. Thus, the adsorbent is regenerated. An adsorption tower in which the adsorbent has been regenerated is again raised in pressure, supplied with a reformed gas, and subjected to another purification operation to yield a product hydrogen.

As problems in the hydrogen PSA process, the known hydrogen PSA process requires very large-sized facilities (very large-sized adsorption towers), because it is difficult to remove carbon monoxide which is contained in a crude hydrogen in a content of up to about 1%, and a large quantity of adsorbents is required. In addition, cost for purifying hydrogen is increased, because the recovery of the product hydrogen is not sufficiently high.

A variety of techniques has been developed for solving these problems. For example, Patent Document 1 discloses a technique of improving the recovery of hydrogen gas from 70% in a known technique up to 76% by a process of carrying out the step of washing an adsorption tower after the adsorption of impurities until at least part of a cleaning gas which has been introduced into the tower to be cleaned is delivered from the tower.

Patent Document 2 discloses a technique of improving the hydrogen gas recovery to 76% by using, as a cleaning gas, a gas in an adsorption tower after the completion of an adsorbing step and setting the amount of the cleaning gas at 2 to 7 times as much as that of the packing volume of the adsorbent. In addition, Patent Document 3 discloses a technique of downsizing hydrogen PSA facilities and improving the hydrogen recovery to 74% by single use of, as an adsorbent, zeolite having a faujasite structure with a silicon/aluminium ratio of 1 to 1.5 and having a lithium ion exchange rate of 95% or more.

According to these techniques, however, all impurity gases including carbon monoxide in hydrogen are removed by the hydrogen PSA process, and adsorbents have insufficient adsorption capacities of CO gas. Thus, there is limitation in downsizing of facilities. In addition, the hydrogen recovery is still insufficient, although improvements by the various techniques have been studied.

As another technique for contributing to downsizing of a hydrogen PSA system, there is studied a technique in which carbon monoxide is not removed directly by hydrogen PSA but removed by oxidizing carbon monoxide in a reformed gas with a selective oxidation catalyst into $CO_2$ and subjecting the resulting reformed gas to hydrogen PSA facilities to thereby remove $CO_2$, $CH_4$, and $H_2O$ in hydrogen (Non-patent Document 1). Although this technique is effective for downsizing the hydrogen PSA system, it causes a lowered hydrogen recovery when considered as a whole system, because excessive oxygen is introduced in selective oxidation of carbon monoxide, and oxygen which has not reacted with carbon monoxide reacts with hydrogen to thereby consume hydrogen.

Non-patent Document 1: New Energy and Industrial Technology Development Organization (NEDO) Report for Fiscal Year 2001, Development of Hydrogen Production Technologies According to New PSA System, 2002

Patent Document 1: Japanese Unexamined Patent Application Publication (JP-A) No. 2002-177726 (e.g., claims)

Patent Document 2: Japanese Unexamined Patent Application Publication (JP-A) No. 2002-191923 (e.g., claims)

Patent Document 3: Japanese Unexamined Patent Application Publication (JP-A) No. 2002-191924 (e.g., claims)

DISCLOSURE OF INVENTION

Problems to be Solved by the Invention

Accordingly, an object of the present invention is to provide a method of producing high-purity hydrogen which recoveries hydrogen from a reformed gas with a high recovery and contributes to downsizing and cost reduction of facilities.

Means for Solving the Problems

As a first invention, there is provided a method of producing high-purity hydrogen, including the steps of reforming a reformable raw material to yield a hydrogen-rich reformed gas as a reforming step; compressing the reformed gas using a compressor to yield a compressed reformed gas as a reformed gas compressing step; allowing the compressed reformed gas to pass through a pressure swing adsorption tower (PSA tower) to remove unnecessary gases other than carbon monoxide by adsorption to thereby yield a carbon monoxide-containing hydrogen gas in an unnecessary gas removing step; and allowing the carbon monoxide-containing hydrogen gas to pass through a carbon monoxide adsorption tower packed with a carbon monoxide adsorbent to remove carbon monoxide by adsorption to thereby yield a high-purity hydrogen as a carbon monoxide removing step.

According to a second invention, the method further includes the step of compressing the carbon monoxide-containing hydrogen gas using a compressor as a carbon monoxide-containing hydrogen gas compressing step between the unnecessary gas removing step and the carbon monoxide removing step.

According to a third invention, the method further includes the step of removing moisture from the reformed gas using an adsorptive dehumidifier as a dehumidifying step between the reforming step and the reformed gas compressing step.

According to a fourth invention, there is provided a method of producing high-purity hydrogen, including the steps of reforming a reformable raw material to yield a hydrogen-rich reformed gas as a reforming step; allowing the reformed gas to pass through a carbon monoxide adsorption tower packed with a carbon monoxide adsorbent to remove carbon monoxide by adsorption to thereby yield a carbon monoxide-removed gas as a carbon monoxide removing step; compressing the carbon monoxide-removed gas using a compressor to yield a compressed gas as a gas compressing step; and allowing the compressed gas to pass through a PSA tower to remove unnecessary gases other than carbon monoxide by adsorption to thereby yield a high-purity hydrogen in an unnecessary gas removing step.

According to a fifth invention, the method further includes the step of compressing the reformed gas using a compressor as a reformed gas compressing step, instead of or in addition to the carbon monoxide-removed gas compressing step, between the reforming step and the carbon monoxide removing step.

According to a sixth invention, the method further includes the step of removing moisture from the reformed gas using an adsorptive dehumidifier as a dehumidifying step between the reforming step and the carbon monoxide removing step.

According to a seventh invention, an alumina adsorbent and/or a silica adsorbent is used as a moisture adsorbent in the adsorptive dehumidifier, and a carbonaceous adsorbent is used as an adsorbent in the PSA.

According to an eight invention, the reforming step is any one of the following steps (a) to (e):

(a) reforming the reformable raw material with steam to yield a hydrogen-rich reformed gas;

(b) reforming the reformable raw material with steam and converting the reformed raw material to yield a hydrogen-rich reformed gas;

(c) reforming a hydrocarbon-containing fuel through partial oxidation to yield a hydrogen-rich reformed gas;

(d) reforming a hydrocarbon-containing fuel through partial oxidation while simultaneously reforming the hydrocarbon-containing fuel with steam to yield a hydrogen-rich reformed gas; and (e) reforming a hydrocarbon-containing fuel with steam and allowing the reformed hydrocarbon-containing fuel to pass through a crude separation membrane such as a ceramic filter to have an increased hydrogen concentration to thereby yield a hydrogen-rich reformed gas.

In a ninth invention, the unnecessary gas removing step includes the steps of removing unnecessary gases other than carbon monoxide by adsorption as an unnecessary gas adsorbing step; and regenerating a PSA adsorbent packed in the PSA tower as a PSA adsorbent regenerating step, and the carbon monoxide removing step includes the steps of removing carbon monoxide by adsorption as a carbon monoxide adsorbing step; and regenerating an adsorbent for carbon monoxide as a carbon monoxide adsorbent regenerating step.

In a tenth invention, the carbon monoxide removing step is carried out using a carbon monoxide remover including two or more carbon monoxide adsorption towers each packed with the carbon monoxide adsorbent, the carbon monoxide adsorbing step and the carbon monoxide adsorbent regenerating step are carried out alternately in each one carbon monoxide adsorption tower, and the carbon monoxide adsorbing step is carried out in at least one carbon monoxide adsorption tower at any optional time.

According to an eleventh invention, the carbon monoxide removing step is carried out using a carbon monoxide remover including three or more carbon monoxide adsorption towers each packed with the carbon monoxide adsorbent, and the following steps (1) and (2) are repeated in the carbon monoxide removing, step:

(1) carrying out the carbon monoxide adsorbent regenerating step in any one carbon monoxide adsorption tower, and carrying out the carbon monoxide adsorbing step in the other carbon monoxide adsorption towers, in which the other carbon monoxide adsorption towers are connected in series; and (2) separating an upstreammost carbon monoxide adsorption tower of the series-connected carbon monoxide adsorption towers from the series connection and connecting a carbon monoxide adsorption tower after the completion of the carbon monoxide adsorbent regenerating step to the downstreammost of the series connection.

In a twelfth invention, the carbon monoxide adsorbent regenerating step includes allowing a part of the high-purity hydrogen to pass through the carbon monoxide adsorption tower to regenerate the carbon monoxide adsorbent.

In a thirteenth invention, a carbon monoxide adsorption tower offgas is used as a raw material for shift reaction in the reforming step, in which the carbon monoxide adsorption tower offgas has been exhausted from the carbon monoxide adsorption tower in the carbon monoxide adsorbent regenerating step.

In a fourteenth invention, a carbon monoxide adsorption tower offgas is used as a purge gas in the PSA adsorbent regenerating step, in which the carbon monoxide adsorption tower offgas has been exhausted from the carbon monoxide adsorption tower in the carbon monoxide adsorbent regenerating step.

In a fifteenth invention, a PSA tower offgas is used as a fuel for producing a reformed gas in the reforming step, in which the PSA tower offgas has been exhausted from the PSA tower in the PSA adsorbent regenerating step.

In a sixteenth invention, combustion heat of the PSA offgas and/or sensible heat of the reformed gas is used as heat for regenerating the carbon monoxide adsorbent in the carbon monoxide adsorbent regenerating step, in which the PSA offgas has been exhausted from the PSA tower in the PSA adsorbent regenerating step.

In a seventeenth invention, the PSA adsorbent regenerating step includes allowing a part of the high-purity hydrogen to pass through the PSA tower to regenerate the PSA adsorbent.

In an eighteenth invention, the carbon monoxide adsorbent regenerating step includes allowing a PSA tower offgas to pass through the carbon monoxide adsorption tower to regenerate the carbon monoxide adsorbent, and the PSA tower offgas has been exhausted from the PSA tower in the PSA adsorbent regenerating step.

In a nineteenth invention, the PSA adsorbent regenerating step includes allowing a PSA tower offgas as a primary purge gas and a part of the high-purity hydrogen as a secondary purge gas to sequentially pass through the carbon monoxide adsorption tower to regenerate the carbon monoxide adsorbent, in which the PSA tower offgas has been exhausted from the PSA tower in the PSA adsorbent regenerating step.

In a twentieth invention, a carbon monoxide adsorption tower offgas and/or a PSA tower offgas is used as a fuel for producing a reformed gas in the reforming step, in which the carbon monoxide adsorption tower offgas has been exhausted from the carbon monoxide adsorption tower in the carbon monoxide adsorbent regenerating step, and the PSA tower offgas has been exhausted from the PSA tower in the PSA adsorbent regenerating step.

In a twenty-first invention, combustion heat of a carbon monoxide adsorption tower offgas, combustion heat of a PSA tower offgas, sensible heat of the reformed gas, or two or more of these are used as heat for heating the carbon monoxide adsorbent in the carbon monoxide adsorbent regenerating step, in which the carbon monoxide adsorption tower offgas has been exhausted from the carbon monoxide adsorption tower in the carbon monoxide adsorbent regenerating step, and the PSA tower offgas has been exhausted from the PSA tower in the PSA adsorbent regenerating step.

In a twenty-second invention, a PSA tower offgas is used as a purge gas in the carbon monoxide adsorbent regenerating step, in which the PSA tower offgas has been exhausted from the PSA tower in the PSA adsorbent regenerating step.

In a twenty-third invention, a carbon monoxide adsorption tower offgas is used as a fuel for producing a reformed gas in the reforming step, in which the carbon monoxide adsorption tower offgas has been exhausted from the carbon monoxide adsorption tower in the carbon monoxide adsorbent regenerating step.

In a twenty-fourth invention, combustion heat of a carbon monoxide adsorption tower offgas and/or sensible heat of the reformed gas is used as heat for regenerating the carbon monoxide adsorbent in the carbon monoxide adsorbent regenerating step, in which the carbon monoxide adsorption tower offgas has been exhausted from the carbon monoxide adsorption tower in the carbon monoxide adsorbent regenerating step.

In a twenty-fifth invention, the carbon monoxide, adsorbing step is carried out at a high pressure of 0.5 MPa (gauge pressure) or more, and the carbon monoxide adsorbent regenerating step is carried out at a reduced pressure of −0.05 MPa (gauge pressure) or less.

In a twenty-sixth invention, the unnecessary gas adsorbing step is carried out at a high pressure of 0.5 MPa (gauge pressure) or more, and the PSA adsorbent regenerating step is carried out under normal pressure.

In a twenty-seventh invention, the carbon monoxide adsorbent is a material including a support and a copper(I) halide and/or a copper(II) halide supported on the support, or is a reduced product of the material, in which the support is at least one support selected from the group consisting of silica, alumina, activated carbon, graphite, and a styrenic resin.

In a twenty-eighth invention, an adsorbent for use in the PSA tower includes a carbonaceous adsorbent; and an alumina adsorbent and/or a silica adsorbent.

Advantages

According to the present invention, a high-purity hydrogen can be recovered with a high recovery from a reformed gas, and thereby a high-purity hydrogen can be obtained at low cost with a significantly downsized production system by using a PSA tower in combination with a carbon monoxide adsorption tower packed with a carbon monoxide adsorbent.

REFERENCE NUMERALS

| | |
|---|---|
| 1: | reforming unit |
| 2: | compressor |
| 3: | PSA unit |
| 4: | carbon monoxide remover |
| 4a, 4b, 4c: | carbon monoxide adsorption tower |
| 5, 6, 8, 9: | buffer tank |
| 7: | vacuum pump |
| A: | reformable raw material |
| B: | reformed gas |
| C: | compressed reformed gas |
| D: | carbon monoxide-containing hydrogen gas |
| E: | high-purity hydrogen (product hydrogen) |
| F, H: | purge gas |
| F1: | primary purge gas |
| F2: | secondary purge gas |
| G: | carbon monoxide adsorption tower offgas |
| J: | raw material for shift reactor |
| K: | PSA tower offgas |
| L, L': | reforming unit fuel |
| M, M': | heating fuel |
| O: | carbon monoxide-removed gas |
| P: | compressed gas |
| Q: | part of PSA tower offgas (purge gas) |
| R: | remainder of PSA tower offgas |
| S: | carbon monoxide adsorption tower offgas |
| T: | reforming unit fuel |
| U: | heating fuel |

BEST MODE FOR CARRYING OUT THE INVENTION

Embodiments of the present invention will be illustrated in detail with reference to the flow charts in FIGS. 1 to 8.

[Embodiment 1]

Figure 1:
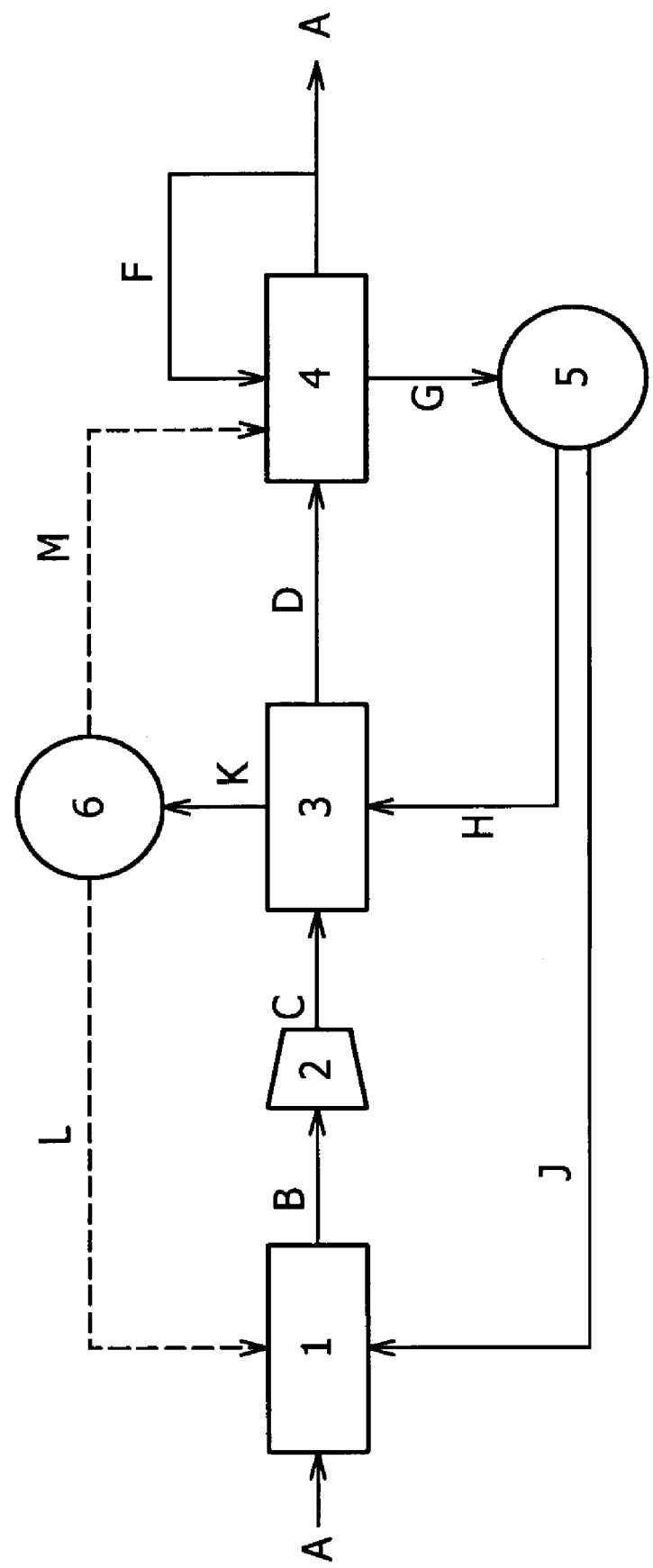
FIG. 1 is a flow chart showing a process of producing high-purity hydrogen according to Embodiment 1.

One of embodiments is shown in the flow chart of FIG. 1 by way of example. In FIG. 1, the numeral 1 represents a reforming unit 1 that reforms a reformable raw material to yield a hydrogen-rich reformed gas; the numeral 2 represents a compressor 2 that compresses the reformed gas to yield a compressed reformed gas; the numeral 3 represents a pressure swing adsorption (PSA) unit 3 that removes unnecessary gases other than carbon monoxide from the compressed reformed gas by adsorption to yield a carbon monoxide-containing hydrogen gas; and the numeral 4 represents a carbon monoxide remover 4 that is packed with a carbon monoxide adsorbent to remove carbon monoxide from the carbon monoxide-containing hydrogen gas by adsorption.

(Reforming Step)

In a reforming step according to the present invention, a reforming unit 1 including a common steam reformer and a common shift reactor in combination may be used. A reformable raw material A containing hydrocarbons, such as natural gas, is reformed to yield a gas mainly containing $H_2$ and CO in the reformer, and steam is added to the gas to convert into a (hydrogen-rich) reformed gas B mainly containing $H_2$ in the shift reactor. The reformed gas B contains $CO_2$, $CH_4$, $H_2O$, and residual carbon monoxide in a low content of about 0.5% to 1.0%, in addition to $H_2$.

(Reformed Gas Compressing Step)

A reformed gas compressing step according to the present invention uses a compressor 2 that compresses the reformed gas B, in which unnecessary gases will be removed from the reformed gas B by pressure swing adsorption in the subsequent unnecessary gas removing step using PSA towers. The compressor 2 compresses the reformed gas B to yield a compressed reformed gas C at an increased pressure of about 1.0 MPa (gauge pressure). In this connection, a heat exchanger (not shown) for cooling the high-temperature reformed gas B is preferably arranged upstream from the compressor 2, because the compressor should be protected, and adsorption reactions are promoted at decreasing temperatures in the subsequent unnecessary gas removing step and carbon monoxide removing step.

(Unnecessary Gas Removing Step)

An unnecessary gas removing step according to the present invention uses a PSA unit 3 including two or more PSA towers each packed with an adsorbent for adsorbing unnecessary gases other than carbon monoxide, namely, $CO_2$, $CH_4$, and $H_2O$. The adsorbent for adsorbing these unnecessary gases (hereinafter also referred to as "PSA adsorbent") is preferably a combination of a carbonaceous adsorbent, such as a carbon molecular sieves, with an alumina adsorbent such as active alumina and/or a silica adsorbent such as silica gel. The alumina adsorbent and/or silica adsorbent acts to remove $H_2O$ from the compressed reformed gas C by adsorption, and the carbonaceous adsorbent acts to remove $CO_2$ and $CH_4$ by adsorption. Since there is no need of positively removing carbon monoxide by adsorption in the PSA unit 3 according to the present invention, the adsorption towers can be significantly downsized as compared with those in the known hydrogen PSA processes. Hereinafter, this step will be illustrated separately as an unnecessary gas adsorbing step and a PSA adsorbent regenerating step.

[Unnecessary Gas Adsorbing Step]: The compressed reformed gas C which has been compressed to about 1 MPa (gauge pressure) is allowed to pass through one of the two or more PSA towers to remove unnecessary gases such as $CO_2$, $CH_4$, and $H_2O$ other than CO gas selectively by adsorption to thereby yield a carbon monoxide-containing hydrogen gas D.

[PSA Adsorbent Regenerating Step]: In the other PSA tower(s), the pressure in the PSA tower(s) is reduced from a high pressure to normal pressure, and a purge gas H is circulated so as to regenerate the adsorbent which has had a lowered adsorption ability due to the adsorption operation. The purge gas H can be, for example, a carbon monoxide adsorption tower offgas G which has been used for the regeneration of a carbon monoxide adsorbent packed in a carbon monoxide adsorption tower of the carbon monoxide remover 4. This will be illustrated in detail in the after-mentioned explanation of effective use of a carbon monoxide adsorption tower offgas. Thus, a carbon monoxide-containing hydrogen gas D can be continuously obtained while maintaining the adsorption ability of the adsorbent over long time by cyclically repeating a cycle including the unnecessary gas adsorbing step and the PSA adsorbent regenerating step in the two or more PSA towers of the PSA tower unit 3.

(Carbon Monoxide Removing Step)

Figure 4:
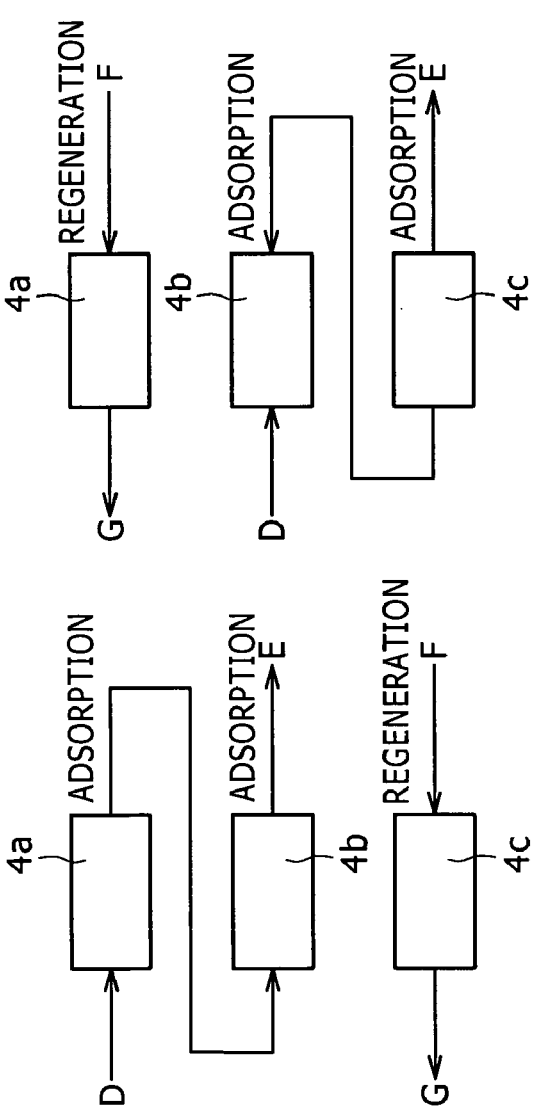
FIG. 4 is a flow chart illustrating a switching operation of a carbon monoxide remover in Embodiment 1.
Figure 5:
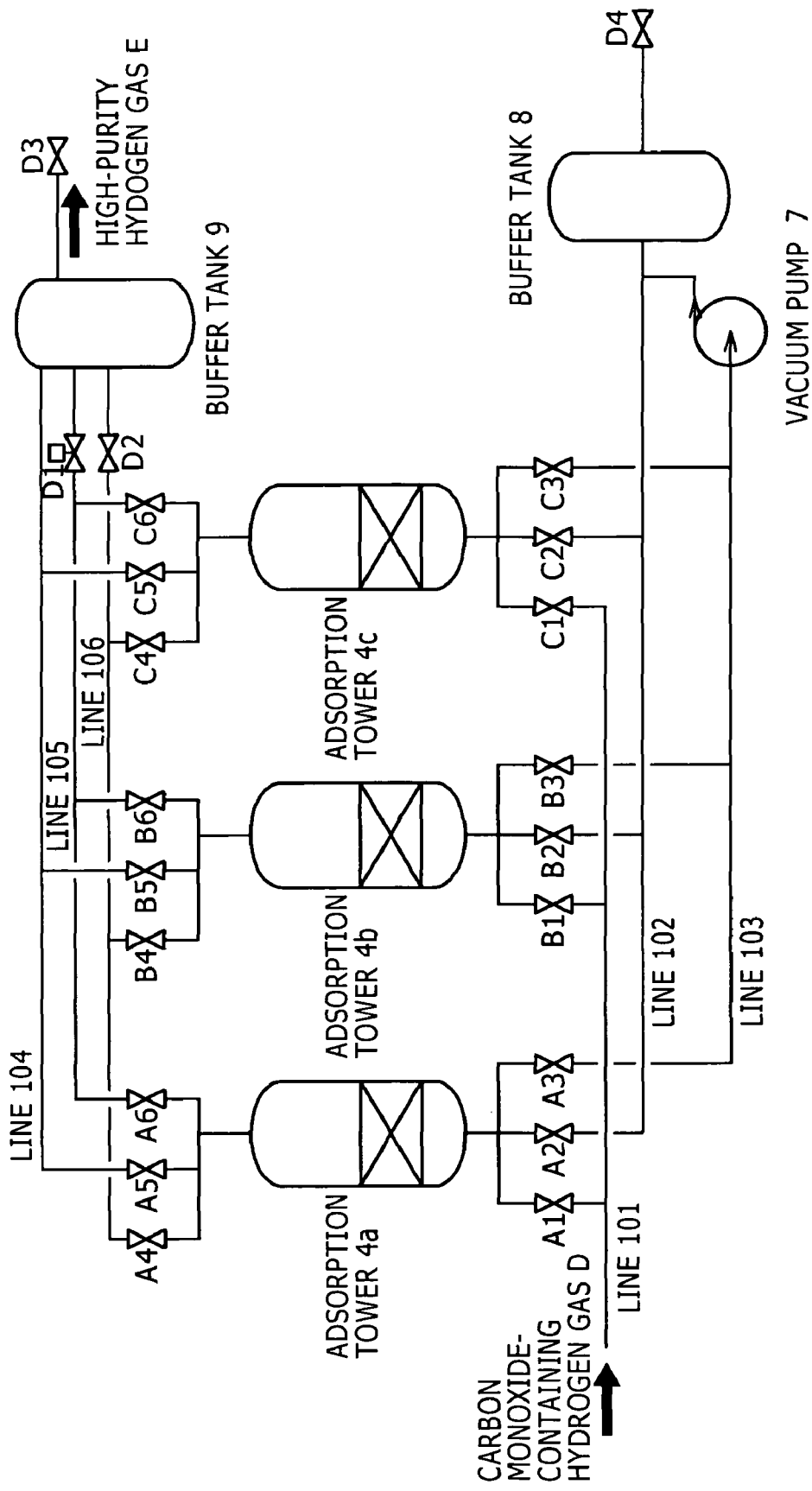
FIG. 5 is a flow chart schematically illustrating a carbon monoxide remover according to Embodiment 4.

The carbon monoxide removing step according to the present invention uses a carbon monoxide remover 4 including two or more (three in the embodiment shown in FIG. 4) carbon monoxide adsorption towers each packed with a carbon monoxide adsorbent, as shown in FIG. 4. Hereinafter this step will be illustrated as dividing into a carbon monoxide adsorbing step and a carbon monoxide adsorbent regenerating step, and a switching operation of these steps will be explained.

[Carbon Monoxide Adsorbing Step]: The carbon monoxide-containing hydrogen gas D is allowed to pass through the carbon monoxide remover 4 packed with a carbon monoxide adsorbent to remove carbon monoxide from the carbon monoxide-containing hydrogen gas D selectively by adsorption. The carbon monoxide adsorbent for use herein is preferably a material including a copper(I) halide and/or a copper(II) halide supported on at least one support selected from the group consisting of silica, alumina, activated carbon, graphite, and a styrenic resin, or a reduced product of this material, because this adsorbent chemically adsorbs carbon monoxide and has high selectivity to carbon monoxide. Among such materials, a material including copper(I) chloride supported on an alumina support is recommended, because this has high mechanical strength, a large carbon monoxide adsorptivity, and a high selectivity. Such a carbon monoxide adsorbent including a supported copper halide contributes to downsizing of the carbon monoxide remover 4, because the adsorbent has an adsorption capacity several times as much as those of known adsorbents such as zeolite molecular sieves, carbon molecular sieves, activated carbon, or active alumina.

[Carbon Monoxide Adsorbent Regenerating Step]: To maintain the adsorption performance of the carbon monoxide adsorbent, the carbon monoxide adsorbent should be regenerated before a carbon monoxide concentration at an outlet of the carbon monoxide remover 4 increases up to a predetermined concentration (becomes breakthrough) in the carbon monoxide adsorbing step. The regeneration of the carbon monoxide adsorbent is carried out while circulating, as a purge gas, a gas substantially free from carbon monoxide, in order to desorb and remove carbon monoxide which has been adsorbed by an adsorption site. The regeneration (cleaning) is preferably carried out while heating the carbon monoxide adsorbent to temperatures of 40° C. to 150° C., because a desorption reaction of carbon monoxide is promoted with an elevating temperature. To satisfy these conditions, the gas substantially free from carbon monoxide for use as the purge gas may be a part F of a product hydrogen E. This may be heated before use by exchanging heat with the reformed gas B (namely, using the sensible heat of the reformed gas B) in the heat exchanger (not shown).

[Switching Operation Between Carbon Monoxide Adsorbing Step and Carbon Monoxide Adsorbent Regenerating Step]: For each carbon monoxide adsorption tower, the carbon monoxide adsorbing step and the carbon monoxide adsorbent regenerating step must be alternately switched. However, the carbon monoxide adsorbing step should be carried out in at least one of the three towers at any time, in order to produce a high-purity hydrogen E continuously. It is recommended to carry out the carbon monoxide adsorbing step in two of the three towers and to carry out the carbon monoxide adsorbent regenerating step in the other one tower so that a carbon monoxide adsorption tower which has been in the carbon monoxide adsorbing step is switched to the carbon monoxide adsorbent regenerating step, and the regeneration is carried out sufficiently, because it takes much time to elevate the temperature of the carbon monoxide adsorbent to such a temperature that the carbon monoxide desorption reaction is activated. In addition, two towers (4a and 4b) in the carbon monoxide adsorbing step are connected in series, and the carbon monoxide-containing hydrogen gas D is allowed to pass through the two towers not in parallel but in series successively to remove carbon monoxide by adsorption (FIG. 4(a)). After elapse of a predetermined time and at the time when the upstream carbon monoxide adsorption tower 4a reaches complete breakthrough with carbon monoxide, the upstream carbon monoxide adsorption tower 4a is separated from the series connection, and a carbon monoxide adsorption tower 4c after the completion of regeneration of its adsorbent is connected downstream from the carbon monoxide adsorption tower 4b. Carbon monoxide is removed by adsorption using the series connection including the carbon monoxide adsorption towers 4b and 4c while carrying out regeneration of the adsorbent of the carbon monoxide adsorption tower 4a (FIG. 4(b)). Then, the operation proceeds to the state shown in FIG. 4(c) and returns to the state shown in FIG. 4(a), and the switching operation is repeated in this manner. Thus, a high-purity hydrogen E from which carbon monoxide has been sufficiently removed can be always obtained without occurrence of breakthrough (increase of the carbon monoxide concentration at the outlet), by connecting two towers in series and carrying out regeneration sequentially from the upstream one of the two. This is because the downstream carbon monoxide adsorption tower always has some residual carbon monoxide adsorption capacity. In addition, cost reduction in adsorbent and downsizing of facilities can be realized, because the upstream carbon monoxide adsorption tower can be used until its adsorption capacity is substantially completely finished up, and this eliminates the need of excessive packing of the adsorbent in each adsorption tower.

(Effective Use of Offgas)

[Effective Use of Carbon Monoxide Adsorption Tower Offgas]: The carbon monoxide adsorption tower offgas G as a gas after the regeneration of the carbon monoxide adsorbent in the carbon monoxide adsorbent regenerating step is preferably temporarily stored in a buffer tank 5 and is effectively used, for example, in the following manner.

The carbon monoxide adsorption tower offgas G contains $H_2$ and CO in high concentrations and can be preferably used as a shift reaction raw material J in the reforming step. By reusing or recycling the carbon monoxide adsorption tower offgas G as the shift reaction raw material J in this manner, the production of high-purity hydrogen per unit reformable raw material increases, and the production cost of high-purity hydrogen can thereby be reduced.

The carbon monoxide adsorption tower offgas G can also be preferably used as a purge gas H for the PSA adsorbent, as schematically illustrated in the description of the PSA adsorbent regenerating step. A product hydrogen after purification is generally used as a purge gas for the PSA adsorbent. The use of the product hydrogen as a purge gas, however, causes a lowered hydrogen recovery as the entire system, thus being not preferred. In contrast, the hydrogen recovery can be prevented from lowering by using the carbon monoxide adsorption tower offgas G as a purge gas according to the present embodiment.

[Effective Use of PSA Tower Offgas]: When the carbon monoxide adsorption tower offgas G is used as the purge gas H for the PSA adsorbent, it is preferred that a PSA tower offgas K as a gas after the regeneration is stored in a buffer tank 6 temporarily, and the offgas K is effectively used, for example, in the following manner.

The PSA offgas K contains unnecessary gases, such as $CO_2$, $CH_4$, and $H_2O$, desorbed from the PSA adsorbent in the PSA adsorbent regenerating step and still contains $H_2$ and CO in high concentrations. Accordingly, it is recommended to use the PSA tower offgas K as a fuel L for producing the reformed gas B in the reforming step and/or as a heating fuel M for regenerating the carbon monoxide adsorbent in the carbon monoxide adsorbent regenerating step, so as to effectively use combustion heat of the $H_2$, CO, and $CH_4$ components in the PSA tower offgas K.

[Embodiment 2]

Figure 2:
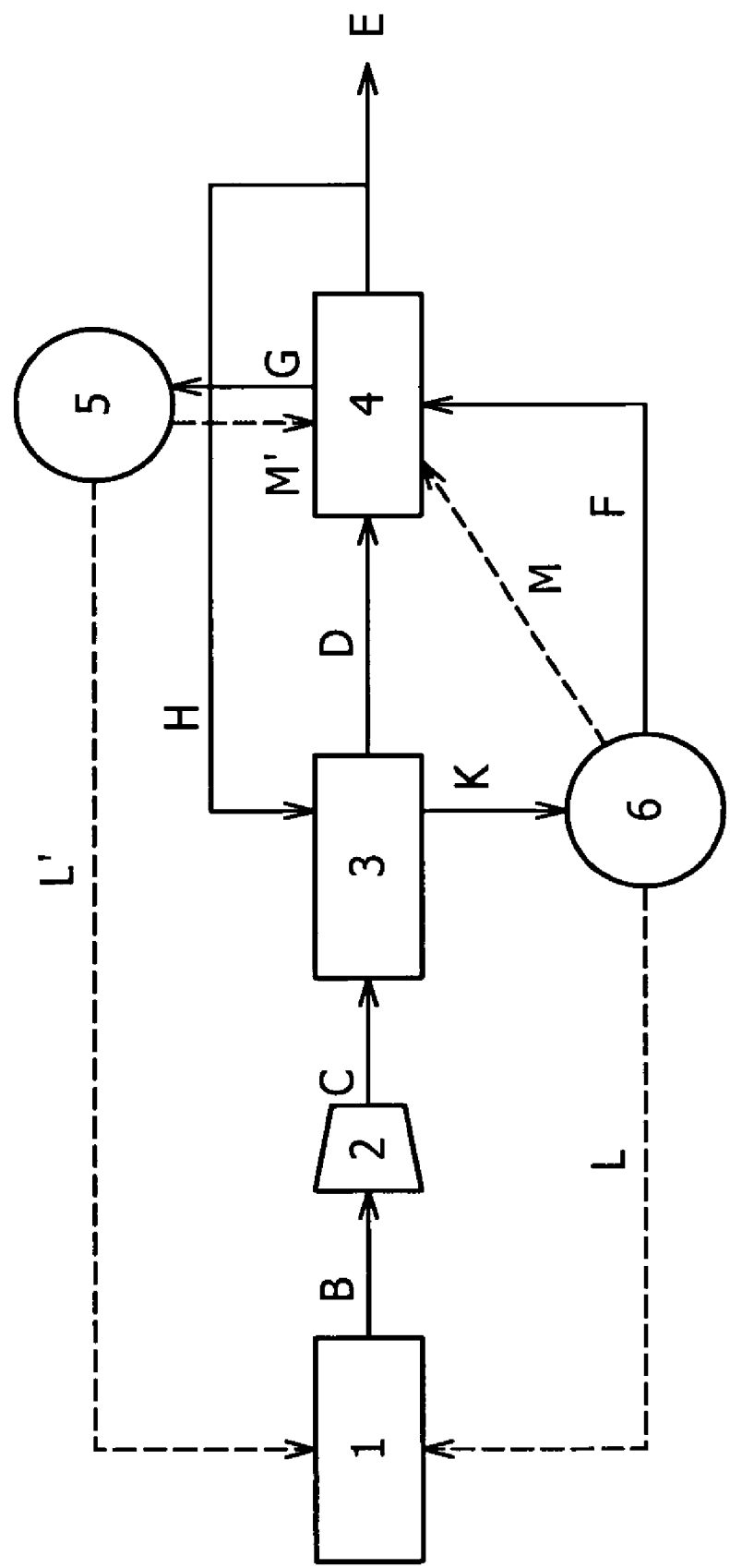
FIG. 2 is a flow chart showing a process of producing high-purity hydrogen according to Embodiment 2.

Another embodiment is shown in FIG. 2. Embodiment 1 illustrates an embodiment in which the part F of high-purity hydrogen is initially circulated in the carbon monoxide remover 4 to regenerate the carbon monoxide adsorbent, and the offgas (carbon monoxide adsorption tower offgas) G thereof is circulated in the PSA unit 3 to regenerate the PSA adsorbent (FIG. 1). With reference to FIG. 2, Embodiment 2 illustrates an embodiment in which the order of circulation is changed; a part of high-purity hydrogen H is initially circulated in the PSA unit 3 to regenerate the PSA adsorbent; and an offgas (PSA tower offgas) K thereof is circulated in the carbon monoxide remover 4 to regenerate the carbon monoxide adsorbent. The hydrogen recovery can be prevented from lowering according to the present embodiment as in Embodiment 1, except for regenerating the carbon monoxide adsorbent using the PSA tower offgas K instead of the high-purity hydrogen E.

The PSA tower offgas K can be used as a purge gas F for the carbon monoxide adsorbent, because it is substantially free from carbon monoxide although it contains, in addition to $H_2$, gases such as $CO_2$, $CH_4$, and $H_2O$ desorbed as a result of the regeneration of the PSA adsorbent. The PSA tower offgas K can also be used as a reforming fuel L and/or a heating fuel M for regenerating the carbon monoxide adsorbent as in Example 1, because it contains $H_2$ and $CH_4$ components having combustion heat.

The carbon monoxide adsorption tower offgas G further contains carbon monoxide desorbed as a result of the regeneration of the carbon monoxide adsorbent, in addition to the components of the PSA tower offgas K. Accordingly, the carbon monoxide adsorption tower offgas G can be used as a reforming fuel L' and/or a heating fuel M' for regenerating the carbon monoxide adsorbent, as with the PSA tower offgas K. However, the gas G is not preferably recycled as a raw material for the shift reactor in the reforming step, because it contains $CH_4$ in contrast to the embodiment in Embodiment 1. Specifically, this is because if a gas containing $CH_4$ is introduced into the shift reactor, the unreacted $CH_4$ concentration in the reformed gas B increases, and a load on the PSA unit 3 thereby increases.

[Embodiment 3]

Figure 3:
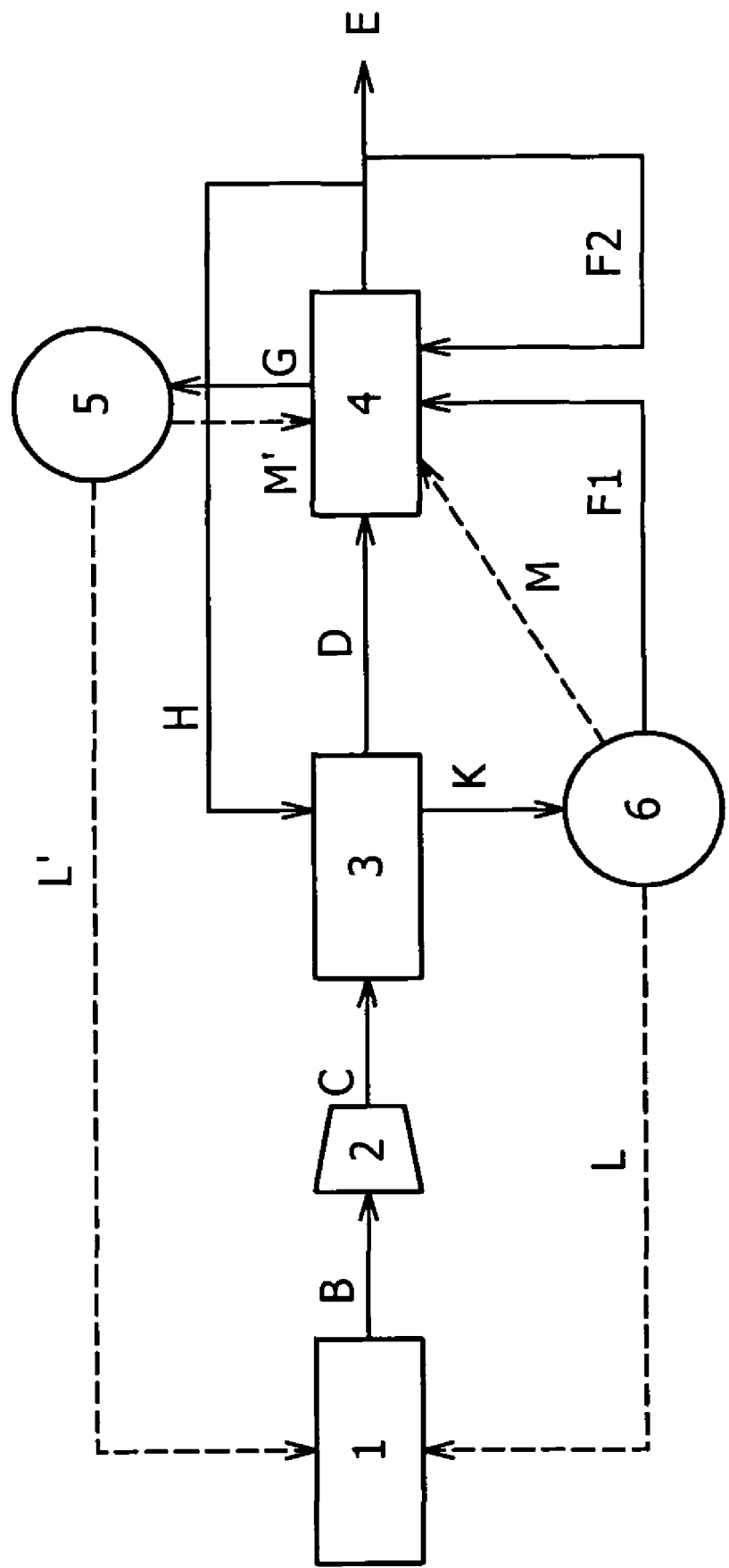
FIG. 3 is a flow chart showing a process of producing high-purity hydrogen according to Embodiment 3.

Yet another embodiment is shown in FIG. 3. The present embodiment (Embodiment 3) illustrates an embodiment in which a part F of high-purity hydrogen is used for regenerating the PSA adsorbent as in Embodiment 2, but the regeneration of the carbon monoxide adsorbent is conducted by circulating a PSA tower offgas K as a regeneration primary cleaning gas F1 and another part of high-purity hydrogen E as a secondary purge gas F2 sequentially in the carbon monoxide adsorption tower.

According to Embodiment 3, a product hydrogen with a further higher purity can be obtained as compared with Embodiment 2. This is because the product hydrogen (high-purity hydrogen) E is used as a secondary purge gas F2, and, by carrying out finish cleaning with the high-purity hydrogen free from impurities, the carbon monoxide adsorbent can be further highly regenerated, although the entire hydrogen recovery is lowered.

(Modified Embodiments of Embodiments 1 to 3)

Embodiments 1 to 3 illustrate an embodiment in which a carbon monoxide-containing hydrogen gas D under normal pressure is introduced into the carbon monoxide remover 4. It is also acceptable that a compressor (carbon monoxide-containing hydrogen gas compressing step) is arranged between the PSA unit 3 and the carbon monoxide remover 4, namely, between the unnecessary gas removing step and the carbon monoxide removing step, and the carbon monoxide-containing hydrogen gas D is compressed with the compressor and then introduced into the carbon monoxide remover 4. Thus, the carbon monoxide adsorption tower can be downsized to thereby reduce cost of facilities, because the carbon monoxide partial pressure in the carbon monoxide-containing hydrogen gas D is increased as a result of compression, and the CO gas adsorption capacity per unit adsorbent is thereby increased, to reduce the amount of carbon monoxide adsorbent.

It is also acceptable to arrange an adsorptive dehumidifier between the reforming unit 1 and the compressor 2 (namely, between the reforming step and the reformed gas compressing step), in other words downstream (subsequent step) from the reforming unit 1. The adsorptive dehumidifier acts to remove $H_2O$ from the reformed gas B. An adsorbent used herein can be an alumina adsorbent or silica adsorbent, or can be a combination of these adsorbents. This eliminates the need of removing $H_2O$ in the PSA unit 3 and contributes to further downsizing of the PSA towers. In addition, dehumidification is carried out before the compressor 2 to thereby prevent moisture condensation in the compressor 2 and to prevent $H_2O$ from contaminating the PSA tower offgas. Thus, the PSA tower offgas has an increased combustion heat and can be more advantageously used as a fuel.

Embodiments 1 to 3 illustrate an embodiment in which three carbon monoxide adsorption towers are sequentially switched in the carbon monoxide removing step. However, it is also acceptable to use and switch two, or four or more carbon monoxide adsorption towers sequentially. When two adsorption towers are used while switching them, it is difficult to use the adsorption capacity of the carbon monoxide adsorbent fully, because an adsorption operation in one adsorption tower used in the adsorption operation must be stopped and the adsorption operation must be switched to the other adsorption tower after the regeneration, before the adsorption tower reaches breakthrough of carbon monoxide (namely, before carbon monoxide begins leaking). In contrast, when three adsorption towers are used while switching them as in Embodiments 1 to 3, the adsorption capacity of the carbon monoxide adsorbent can be substantially completely used, and the amount of the adsorbent can be significantly reduced. Accordingly, use of three towers is more recommended than use of two towers. In this connection, a system of carrying out operations under high pressure using three towers with switching can reduce the amount of the adsorbent to about one-fifths of that in a system of carrying out operations under normal pressure using two towers with switching.

When there is no need of continuously producing high-purity hydrogen over a long period of time, two or more carbon monoxide adsorption towers are not necessarily used with switching. In this case, it is acceptable that a single carbon monoxide adsorption tower is used and the adsorbent is regenerated or exchanged, for example, upon periodical inspections.

Embodiments 1 to 3 illustrate an embodiment in which offgases (carbon monoxide adsorption tower offgas G and PSA tower offgas K) are once stored in buffer tanks 5 and 6 and then distributed to respective units. It is also acceptable that either one or both of the buffer tanks 5 and 6 are omitted, and either one or both of the offgases are directly introduced into respective units. In this case, however, there may often occur excess and deficiency in the amounts of offgases and the amounts of gases to be introduced into respective units, and it is difficult to keep balance between the gas amounts. Accordingly, the buffer tanks 5 and 6 are preferably arranged.

Embodiments 1 to 3 illustrate an embodiment in which a reformer and a shift reactor are used in combination in the reforming step. It is also acceptable to use a crude separation membrane, such as a ceramic filter, instead of the shift reactor. Specifically, Embodiments 1 to 3 illustrate, as the reforming step, a step of reforming a reformable raw material with steam, and then converting the reformed material to yield a hydrogen-rich reformed gas. However, there can also be naturally adopted a step of reforming the raw material with steam, and circulating the reformed material in a crude separation membrane, such as a ceramic filter, to increase the hydrogen concentration to thereby yield a hydrogen-rich reformed gas.

In addition, there can be established a process in which a shift reactor is omitted and a reformer alone is used at some carbon monoxide adsorption performance of the carbon monoxide adsorbent. Specifically, there can be adopted, as the reforming step, a step of carrying out only steam reforming to yield a reformed gas. In addition, there can also be adopted a step of forming a reformed gas through partial oxidation instead of steam reforming, or a step of concurrently carrying out reforming through partial oxidation and steam reforming to yield a reformed gas.

[Embodiment 4]

Embodiments 1 to 3 illustrate an embodiment in which regeneration is carried out while the carbon monoxide adsorbent is heated (namely, temperature swing). However, the regeneration may be carried out by pressure swing as with the PSA adsorbent. It is acceptable, for example, to carry out the carbon monoxide adsorbing step at a high pressure of 0.5 MPa (gauge pressure) or more and to carry out the carbon monoxide adsorbent regenerating step at a reduced pressure of −0.05 MPa (gauge pressure) or less. This will be illustrated in detail hereinbelow, with reference to the flow chart of a carbon monoxide remover 4 in FIG. 5.

The carbon monoxide remover 4 includes three carbon monoxide adsorption towers 4a, 4b, and 4c, and the respective adsorption towers 4a, 4b, and 4c are packed with an adsorbent such as a carbon monoxide adsorbent including copper(I) chloride supported on alumina. A line 101 is an inlet line for the carbon monoxide-containing hydrogen gas D. The line 101 is connected to the carbon monoxide adsorption towers 4a, 4b, and 4c via a valve A1, a valve B1, and a valve C1, respectively.

A line 102 is a line for reducing the pressure inside a carbon monoxide adsorption tower and is used to reduce the pressure of a carbon monoxide adsorption tower after the completion of pressure equalization (see the after-mentioned pressure equalization step) to around normal pressure (see the after-mentioned first pressure reducing step). The line 102 is connected to the adsorption towers 4a, 4b, and 4c via a valve A2, a valve B2, and a valve C2, respectively.

A line 103 is a line to reduce the pressure of a carbon monoxide adsorption tower after the completion of pressure reduction to around normal pressure (the first pressure reducing step) further to a negative pressure of atmospheric pressure or less (−0.05 MPa (gauge pressure) or less) (see the after-mentioned second pressure reducing step). The line 103 is connected to a vacuum pump 7 and to the adsorption towers 4a, 4b, and 4c via a valve A3, a valve B3, and a valve C3, respectively. An exhaust gas from the vacuum pump connected to the line 102 and the line 103 is temporarily stored in a buffer tank 8. The gas stored in the buffer tank 8 can be effectively used, for example, as a fuel for the reformer in the production of the reformed gas B.

A line 104 is a line for recovering a high-purity hydrogen E as a result of removal of CO gas from the carbon monoxide-containing hydrogen gas D in the carbon monoxide adsorption tower. The line 104 is connected to the carbon monoxide adsorption towers 4a, 4b, and 4c via a valve A5, a valve B5, and a valve C5, respectively. The recovered high-purity hydrogen E is temporarily stored in a buffer tank 9.

A line 105 is a line for washing and thereby regenerating the carbon monoxide adsorption tower after the completion of carbon monoxide adsorbing step of CO gas and after pressure reduction (see the after-mentioned second pressure reducing step). The line 105 is connected to the buffer tank 9 via a valve D1 and is connected to the carbon monoxide adsorption towers 4a, 4b, and 4c via a valve A6, a valve B6, and a valve C6, respectively. A part of the recovered high-purity hydrogen E can thereby be used as a purge gas for the carbon monoxide adsorbent. A PSA tower offgas K can also be used as the purge gas for the carbon monoxide adsorbent. In this case, there is no need of using the high-purity hydrogen E, and the recovery of a purified high-purity hydrogen (product hydrogen) can further be increased.

A line 106 is a line for carrying out pressure equalization (pressure equalization step) and is used for conducting gas pressure equalization between a carbon monoxide adsorption tower after the completion of the carbon monoxide adsorbing step and another carbon monoxide adsorption tower after the completion of the carbon monoxide adsorbent regenerating step. Specifically, the pressure equalization between the two carbon monoxide adsorption towers is enabled by, of the valve A4, valve B4, and valve C4, opening two valves connected to the two towers subjected to pressure equalization, and closing the other valve.

Next, operating procedures of removing carbon monoxide by adsorption and regenerating the carbon monoxide adsorbent in the carbon monoxide removing step will be specifically illustrated. Hereinbelow, only operating procedures for the carbon monoxide adsorption tower 4a will be illustrated. However, an actual operation is conducted cyclically using the three carbon monoxide adsorption towers 4a, 4b, and 4c as shown in the timetable in Table 1.

1) [Carbon Monoxide Adsorbing Step]: A high-pressure carbon monoxide-containing hydrogen gas D, from which unnecessary gases have been removed in the PSA unit 3, is introduced into the adsorption tower 4a, and CO gas is removed therefrom by the action of the carbon monoxide adsorbent to recovery a high-purity hydrogen E (the valves A2, A3, A4, and A6: closed, the valves A1 and A5: open).

2) [Pressure Equalization Step]: The carbon monoxide adsorption operation (carbon monoxide adsorbing step) is completed, and a part of the gas from the carbon monoxide adsorption tower 4a is transferred to the adsorption tower 4c after the completion of a regeneration operation (carbon monoxide adsorbent regenerating step). When a carbon monoxide adsorption operation of the carbon monoxide adsorption tower 4a is carried out, for example, at 0.9 MPa (gauge pressure), the inner pressures of the carbon monoxide adsorption towers 4a and 4c become each about 0.5 MPa (gauge pressure) in this step, because the regeneration of the carbon monoxide adsorbent of the carbon monoxide adsorption tower 4c is conducted under a reduced pressure (the valves A1, A2, A3, A5, A6, C1, C2, C3, C5, and C6: closed, the valves A4 and C4: open).

3) [First Pressure Reducing Step]: The inner pressure of the adsorption tower 4a after the completion of the pressure equalization operation (pressure reducing step) is reduced to around normal pressure (the valves A1, A3, A4, A5, and A6: closed, the valve A2: open).

4) [Second Pressure Reducing Step]: The pressure of the carbon monoxide adsorption tower 4a after the pressure reduction to around normal pressure is further reduced to a negative pressure using the vacuum pump 7 (the valves A1, A2, A4, A5, and A6: closed, the valve A3: open)

5) [Carbon Monoxide Adsorbent Regenerating Step]: A cleaning gas is allowed to pass under the reduced pressure to regenerate the carbon monoxide adsorbent (the valves A1, A2, A4, and A5: closed, the valves A3, A6, and D1: open)

6) [Pressure Equalization Step]: A part of the gas in the carbon monoxide adsorption tower 4b after the completion of the carbon monoxide adsorbing step is transferred to the carbon monoxide adsorption tower 4a after the completion of the regeneration of the carbon monoxide adsorbent (the valves A1, A2, A3, A5, A6, B1, B2, B3, B5, and B6: closed, the valves A4 and B4: open).

7) [Pressure Rising Step]: The high-purity hydrogen E is introduced from the buffer tank 9 into the adsorption tower 4a, and the pressure in the carbon monoxide adsorption tower 4a is raised to such a pressure as to carryout carbon monoxide adsorption (the valves A1, A2, A3, A4, and A6: closed, the valve A5: open).

8) The operation steps 1) to 7) are repeated to thereby repeat the carbon monoxide removal by adsorption and the regeneration of carbon monoxide adsorbent.

TABLE 1

| Adsorption tower | 4a | 4b | 4c |
|---|---|---|---|
| Operation step | Adsorption | Pressure equalization | |
| | | Pressure rising | First pressure reduction |
| | | | Second pressure reduction |
| | | | Regeneration |
| | Pressure equalization | Adsorption | Pressure equalization |
| | First pressure reduction | | Pressure rising |
| | Second pressure reduction | | |
| | Regeneration | | |
| | Pressure equalization | | Adsorption |
| | Pressure rising | First pressure reduction | |
| | | Second pressure reduction | |
| | | Regeneration | |

According to the process of the present embodiment, the carbon monoxide adsorbent is regenerated under a negative pressure which has been further reduced below normal pressure, and CO gas is removed from the carbon monoxide-containing hydrogen gas D by adsorption under a high pressure in the carbon monoxide remover 4. This enables the removal of carbon monoxide from the carbon monoxide-containing hydrogen gas D with a downsized unit and enables an increased yield of carbon monoxide (i.e., carbon monoxide removing efficiency).

On the other hand, it is recommended to allow the PSA unit 3 to purify (to remove) unnecessary gases other than carbon monoxide by pressure swing between normal pressure and a high pressure. It is also possible that the adsorbent in the PSA unit 3 is regenerated under a reduced pressure. In this case, although an improved yield of unnecessary gases (i.e., removing efficiency of unnecessary gases) is expected as compared with regeneration under normal pressure, the power for pressure reduction using a vacuum pump is excessively large, because the volume of adsorption towers is larger than that of the carbon monoxide remover 4. Accordingly, a carbon monoxide remover 4 for removing carbon monoxide and a PSA unit 3 for removing unnecessary gases other than carbon monoxide are separately arranged, and regeneration under a reduced pressure and regeneration under normal pressure are carried out in the respective units. Thus, the running cost for purifying gases can be saved, and a downsized treatment process having high economical efficiency as a whole can be constituted.

(Modified Embodiments of Embodiment 4)

Embodiment 4 illustrates an embodiment in which the carbon monoxide remover 4 is composed of three carbon monoxide adsorption towers. The carbon monoxide remover 4 may also be composed of two, or four or more carbon monoxide adsorption towers, as in Embodiments 1 to 3. However, it is recommended to constitute the carbon monoxide remover 4 with three or more towers, because if it is composed of two towers, a pressure equalization operation using two towers as illustrated in Embodiment 4 cannot be carried out, and the pressure energy of a pressurized gas is not recovered effectively.

When there is no need of producing a high-purity hydrogen continuously over a long period of time, the carbon monoxide remover 4 may be composed of a single carbon monoxide adsorption tower, as in Embodiments 1 to 3.

Embodiment 4 illustrates an embodiment in which the pressure of the carbon monoxide-containing hydrogen gas D as intact as exhausted from the PSA unit 3 is used for an adsorption operation in the carbon monoxide remover 4. In another embodiment, an extra compressor may be arranged between the PSA unit 3 and the carbon monoxide remover 4 to carry out an adsorption operation at a pressure higher than that in the PSA unit 3.

[Embodiment 5]

Figure 6:
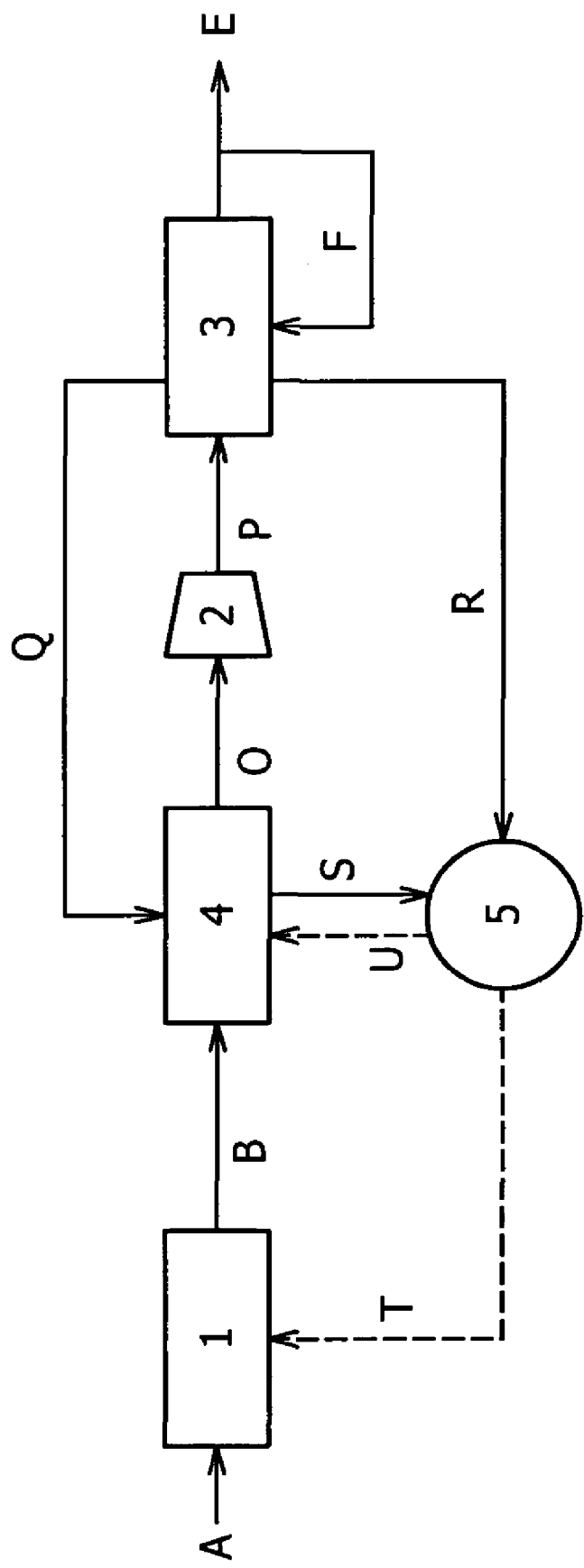
FIG. 6 is a flow chart showing a process of producing high-purity hydrogen according to Embodiment 5.

Embodiments 1 to 4 illustrate an embodiment in which the carbon monoxide remover 4 is arranged downstream from the PSA unit 3. In contrast, this embodiment (Embodiment 5) illustrates an embodiment in which the carbon monoxide remover 4 is arranged upstream from the PSA unit 3. Specifically, in Embodiments 1 to 4, processes are conducted in the order of the reforming unit 1, the compressor 2, the PSA unit 3, and the carbon monoxide remover 4 to yield a high-purity hydrogen E as a product hydrogen. In contrast, in Embodiment 5, processes are conducted in the order of the reforming unit 1, the carbon monoxide remover 4, the compressor 2, and the PSA unit 3 to yield a high-purity hydrogen E, as shown in FIG. 6. Hereinafter this will be illustrated in detail with reference to the flow chart in FIG. 6. The reforming step herein is as in Embodiment 1.

(Carbon Monoxide Removing Step)

Figure 7:
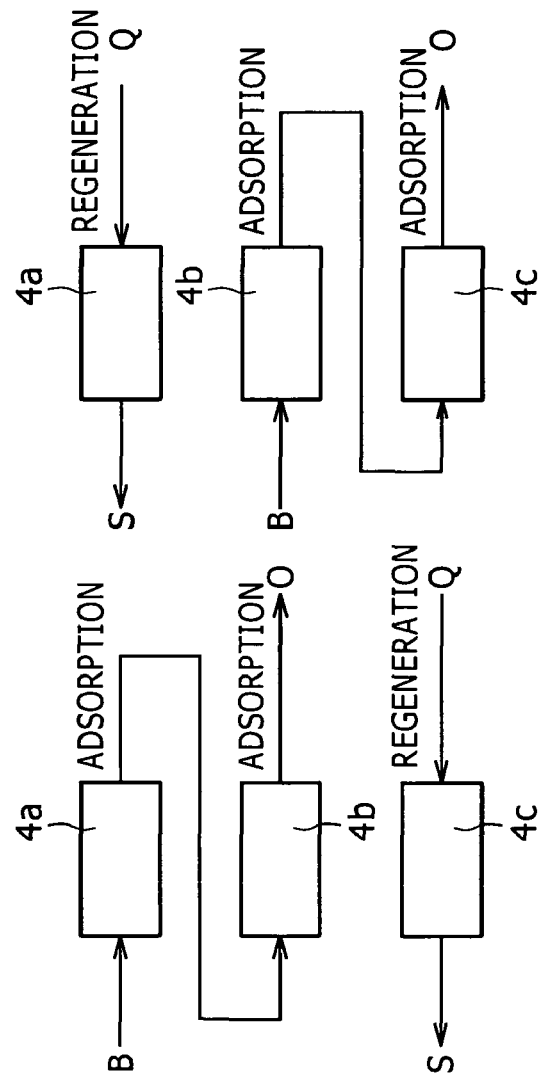
FIG. 7 is a flow chart illustrating a switching operation of a carbon monoxide remover in Embodiment 5.

A carbon monoxide removing step according to Embodiment 5 uses a carbon monoxide remover 4 composed of three carbon monoxide adsorption towers 4a, 4b, and 4c shown in FIG. 7, as in Embodiment 1.

[Carbon Monoxide Adsorbing Step]: A reformed gas B is allowed to pass through the carbon monoxide remover 4 to remove carbon monoxide from the reformed gas B selectively by adsorption. A carbon monoxide adsorbent to be packed in the carbon monoxide remover 4 can be any of materials as in Embodiment 1. Among them, a material including copper(I) chloride supported on an alumina support is preferred, because a high-purity hydrogen E of a high purity of about five nines can be stably and efficiently produced to thereby significantly reduce the production cost even when the carbon monoxide remover 4 is downsized.

[Carbon Monoxide Adsorbent Regenerating Step]: The regeneration of the carbon monoxide adsorbent for maintaining its adsorption performance may be carried out by using a part Q of the PSA tower offgas as a gas substantially free from carbon monoxide used as a purge gas, and heating the gas Q through heat exchange between the gas Q and the reformed gas B in a heat exchanger (not shown) (namely, through the use of the sensible heat of the reformed gas B). The PSA tower offgas is obtained as a result of washing and regenerating the PSA unit 3 with a part F of the high-purity hydrogen E.

[Switching Operation Between Carbon Monoxide Adsorbing Step and Carbon Monoxide Adsorbent Regenerating Step]: It is necessary to carry out the carbon monoxide adsorbing step always in at least one of the three towers for continuously producing a high-purity hydrogen E, as in Embodiment 1. Accordingly, two towers (4a and 4b) in the carbon monoxide adsorbing step are connected in series, the reformed gas B is allowed to pass through the two towers sequentially to remove carbon monoxide by adsorption (FIG. 7(*a*)). After elapse of a predetermined time and after the upstream carbon monoxide adsorption tower 4a undergoes complete breakthrough of carbon monoxide, the upstream carbon monoxide adsorption tower 4a is separated from the series connection, and the carbon monoxide adsorption tower 4c after the completion of regeneration of the adsorbent is connected downstream from the carbon monoxide adsorption tower 4b. Carbon monoxide is then removed by adsorption using the series connection including the carbon monoxide adsorption towers 4b and 4c while regenerating the adsorbent of the carbon monoxide adsorption tower 4a (FIG. 7(*b*)). Subsequently, the operation proceeds to the state of FIG. 7(*c*) and returns to the state of FIG. 7(*a*), and the switching operation is repeated.

(Reformed Gas Compressing Step)

A reformed gas compressing step according to Embodiment 5 uses a compressor 2 for compressing a carbon monoxide-removed gas O to carry out removal of unnecessary gases by adsorption in a subsequent unnecessary gas removing step as in Embodiment 1. Specifically, the carbon monoxide-removed gas O is compressed to yield a compressed gas P having an increased pressure of about 1.0 MPa (gauge pressure).

(Unnecessary Gas Removing Step)

Adsorption towers of a PSA unit 3 for use in an unnecessary gas removing step according to Embodiment 5 can be significantly downsized as compared with those in Embodiment 1, because carbon monoxide has been already removed in the precedent carbon monoxide remover 4, and there is no need of removing carbon monoxide by adsorption in the PSA unit 3. This step will be illustrated as separating into an unnecessary gas adsorbing step and a PSA adsorbent regenerating step.

[Unnecessary Gas Adsorbing Step]: The compressed gas P which has been compressed to about 1 MPa (gauge pressure) is allowed to pass through one of two or more PSA towers to remove unnecessary gases other than CO gas, such as $CO_2$, $CH_4$, and $H_2O$, selectively by adsorption to thereby yield a product hydrogen (high-purity hydrogen) E.

[PSA Adsorbent Regenerating Step]: For regenerating the adsorbent having a lowered adsorption ability, the pressure in a PSA tower is reduced from a high pressure to normal pressure, and a purge gas F is circulated. As the purge gas F, a part F of the product hydrogen E may be used as in Embodiment 1. The product hydrogen (high-purity hydrogen) E can be continuously obtained while maintaining the adsorption ability of the adsorbent over a long period of time by cyclically continuing a cycle composed of an unnecessary gas adsorbing step and a PSA adsorbent regenerating step in two or more PSA towers in this manner.

(Effective Use of Offgas)

[Effective Use of PSA Tower Offgas]: A PSA tower offgas contains $H_2$ as a main component of the product hydrogen E and further contains unnecessary gases, such as $CO_2$, $CH_4$, $H_2O$, desorbed as a result of regeneration of the PSA adsorbent. However, a part Q of this offgas can be used as a purge gas for the carbon monoxide adsorbent as described in the carbon monoxide adsorbent regenerating step, because it does not contain carbon monoxide. In this connection, it is possible to use a product hydrogen after purification as the purge gas for the carbon monoxide adsorbent (i.e., gas substantially free from carbon monoxide). However, the use of a product hydrogen as the purge gas causes a lowered hydrogen recovery in the system as a whole, being not preferred. In contrast, the hydrogen recovery can be prevented from lowering by using a part Q of the PSA tower offgas in the present embodiment. The remainder R of the PSA tower offgas, other than a part for use as the purge gas for the carbon monoxide adsorbent, contains $H_2$ and $CH_4$ as described above. For effectively using combustion heat of these components, it is recommended to store the remainder R temporarily in a buffer tank 5 and is used as a fuel T for producing the reformed gas B in the reforming step and/or a heating fuel U for regenerating the carbon monoxide adsorbent in the carbon monoxide adsorbent regenerating step.

[Effective Use of Carbon Monoxide Adsorption Tower Offgas]: A carbon monoxide adsorption tower offgas S is a gas after the regeneration of the carbon monoxide adsorbent in the carbon monoxide adsorbent regenerating step and further contains carbon monoxide desorbed as a result of the regeneration of the carbon monoxide adsorbent, in addition to the components of the PSA tower offgas Q. Accordingly, the offgas S can be temporarily stored in the buffer tank 5 together with the remainder R and used as the reforming fuel T and/or the heating fuel U for regenerating the carbon monoxide adsorbent, as above.

(Modified Embodiments of Embodiment 5)

Embodiment 5 illustrates an embodiment in which the compressor 2 (carbon monoxide-removed gas compressing step) is arranged between the carbon monoxide remover 4 and the PSA unit 3. It is also acceptable that an extra compressor (reformed gas compressing step) is further arranged between the reforming unit 1 and the carbon monoxide remover 4 (i.e., as a subsequent step of the reforming step as in Embodiment 1), and the reformed gas B is compressed, for example, to about 1.0 MPa using this compressor and is then introduced into the carbon monoxide remover 4. In this case, the carbon monoxide adsorption tower can be downsized to thereby reduce the cost of facilities, because the reformed gas B has an increased carbon monoxide partial pressure as a result of compression, and the CO gas adsorption capacity per unit adsorbent is increased to thereby reduce the amount of the carbon monoxide adsorbent. In this connection, there is no problem with the omission of the compressor 2, because a carbon monoxide-removed gas O exhausted from the carbon monoxide remover 4 is introduced under high pressure into the PSA unit 3 without pressure reduction.

A dehumidifier may be arranged downstream (subsequent step) of the reforming unit 1, as illustrated in the modified embodiment of Embodiments 1 to 3. When a compressor is arranged between the reforming unit 1 and the carbon monoxide remover 4 as in the modified embodiment of Embodiment 5, the dehumidifier is preferably arranged upstream from the compressor for exhibiting the effect of preventing moisture condensation.

It is also acceptable that two, or four or more carbon monoxide adsorption towers are used with switching in a carbon monoxide removing step according to Embodiment 5. In this connection, a system of carrying out operations under high pressure using three towers with switching can reduce the amount of the adsorbent to about one-fifths of that in a system of carrying out operations under normal pressure using two towers with switching. It is naturally acceptable that a single carbon monoxide adsorption tower is used and the adsorbent is regenerated or exchanged, for example, upon periodical inspection.

Embodiment 5 illustrates an embodiment in which the remainder R of the PSA tower offgas and the carbon monoxide adsorption tower offgas S are together stored in the one buffer tank 5. These gases may be stored in two different buffer tanks and used separately.

Embodiment 5 illustrates an embodiment in which a part of the PSA tower offgas as the purge gas for the carbon monoxide adsorbent is directly introduced into a carbon monoxide adsorption tower, and the remainder is stored in a buffer tank. It is also acceptable that all of the PSA tower offgas is once stored in a buffer tank different from one for the carbon monoxide adsorption tower offgas, and a part of the stored PSA tower offgas is supplied to the carbon monoxide adsorption tower.

Embodiment 5 illustrates an embodiment in which the offgases (the remainder R of the PSA tower offgas and the carbon monoxide adsorption tower offgas S) are stored in the buffer tank 5 and are then distributed to respective units from the buffer tank 5. It is also acceptable that the buffer tank 5 is omitted, and the offgases are directly introduced into respective units. However, there often occurs excess and deficiency in offgas amounts and amounts of gases introduced into respective units, and it is difficult to keep good balance in gas amounts in this case. Accordingly, the buffer tank 5 is preferably arranged.

Embodiment 5 illustrates an embodiment in which a reformer and a shift reactor are used in combination in a reforming step. It is also acceptable to use a crude separation membrane, such as a ceramic filter, instead of the shift reactor, as illustrated in the modified embodiment of Embodiments 1 to 3. In addition, there can be established a process in which a shift reactor is omitted and a reformer alone is used at some carbon monoxide adsorption performance of the carbon monoxide adsorbent.

[Embodiment 6]

Embodiment 5 illustrates an embodiment in which the regeneration is carried out while the carbon monoxide adsorbent is heated (namely, temperature swing). However, the regeneration may be carried out by pressure swing as in Embodiment 4.

Figure 8:
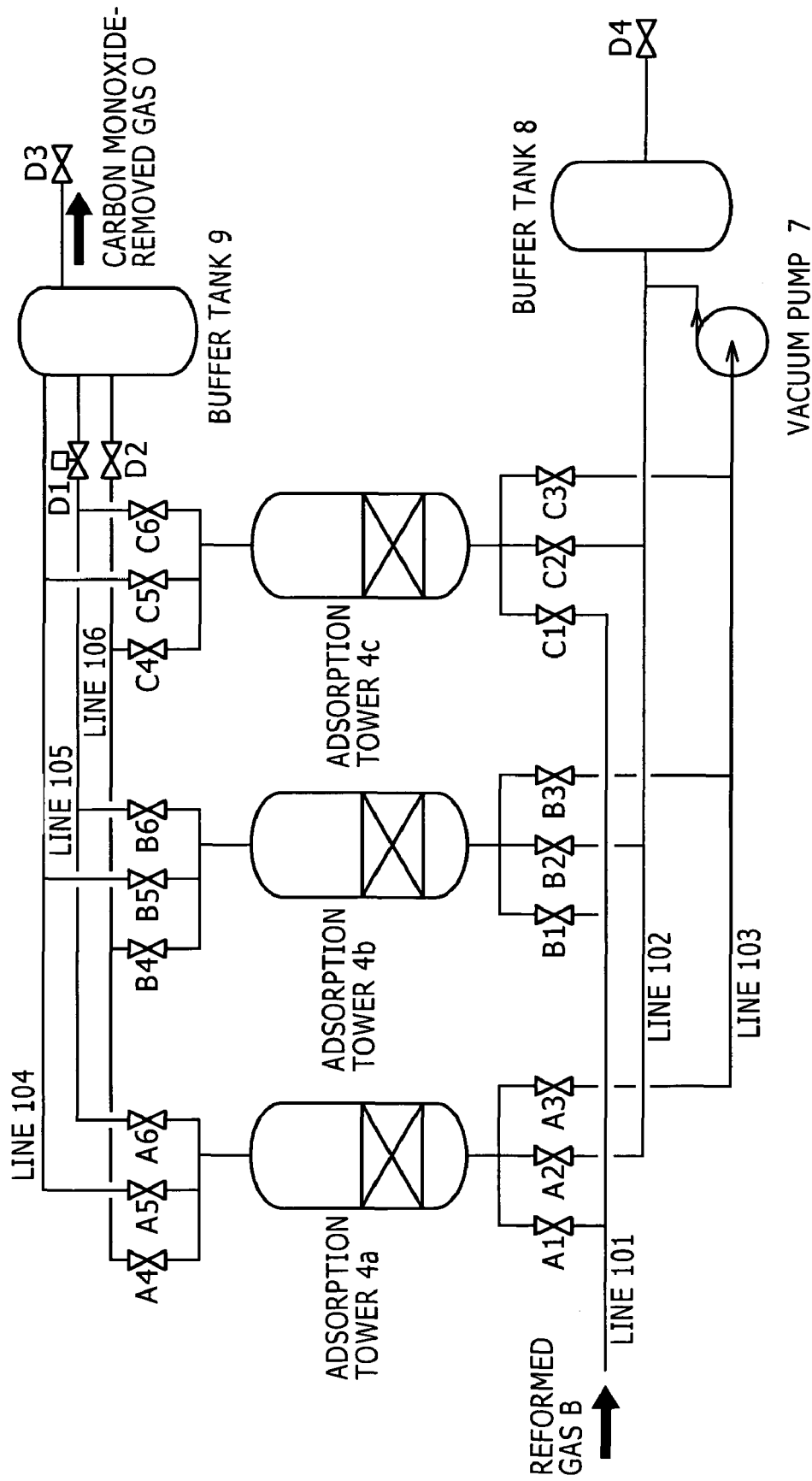
FIG. 8 is a flow chart schematically illustrating a carbon monoxide remover according to Embodiment 6.

In Embodiment 6 as illustrated in FIG. 8, the connections and configurations are as with Embodiment 4, for respective carbon monoxide adsorption towers 4a, 4b, and 4c, lines 101, 102, 103, 104, 105, and 106, valves A1, A2, A3, A4, A5, A6, B1, B2, B3, B4, B5, B6, C1, C2, C3, C4, C5, C6, D1, D2, D3, and D4, a vacuum pump 7, and buffer tanks 8 and 9. Embodiment 6 differs from Embodiment 4 in that a reformed gas B is supplied from a reforming unit 1 in a precedent step to a carbon monoxide remover 4, and that a carbon monoxide-removed gas O is supplied to a compressor 2 in a subsequent step.

Embodiment 6 adopts pressure swing in the carbon monoxide remover 4. Accordingly, the compressor 2 must be arranged upstream from the carbon monoxide remover 4, namely, between the reforming unit 1 and the carbon monoxide remover 4 so as to pressurize the reformed gas B before being introduced into the line 101, whereas the compressor 2 is arranged downstream from the carbon monoxide remover 4 in Embodiment 5. A purge gas for the carbon monoxide adsorbent can be a part of a recovered carbon monoxide-removed gas O. The purge gas for the carbon monoxide adsorbent can also be a part Q of the PSA tower offgas. This eliminates the need of using the carbon monoxide-removed gas O, and further increases the recovery of a purified high-purity hydrogen (product hydrogen).

Next, operating procedures of carbon monoxide removal by adsorption and regeneration of the carbon monoxide adsorbent in a carbon monoxide removing step according to Embodiment 6 will be illustrated specifically. Hereinbelow, only operating procedures for the carbon monoxide adsorption tower 4a will be illustrated. However, an actual operation is conducted cyclically using the three carbon monoxide adsorption towers 4a, 4b, and 4c as shown in the timetable of Table 1 in Embodiment 4.

1) [Carbon Monoxide Adsorbing Step]: A high-pressure reformed gas B compressed in the compressor is introduced into the adsorption tower 4a, CO gas is removed by a carbon monoxide adsorbent, and a carbon monoxide-removed gas O is recovered (the valves A2, A3, A4, and A6: closed, the valves A1 and A5: open).

Subsequent 2) [pressure equalization step], 3) [first pressure reducing step], 4) [second pressure reducing step], 5) [carbon monoxide adsorbent regenerating step], and 6) [pressure equalization step] are as in Embodiment 4.

7) [Pressure Rising Step]: The carbon monoxide-removed gas O is introduced from the buffer tank 9 into the adsorption tower 4a, and the pressure in the carbon monoxide adsorption tower 4a is raised to such a pressure as to carry out carbon monoxide adsorption (the valves A1, A2, A3, A4, and A6: closed, the valve A5: open).

8) The operation steps 1) to 7) are repeated to thereby repeat the carbon monoxide removal by adsorption and the regeneration of carbon monoxide adsorbent.

According to the process of the present embodiment, the carbon monoxide adsorbent is regenerated under a negative pressure which has been further reduced below normal pressure, and CO gas is removed from the modified gas B by adsorption under a high pressure in the carbon monoxide remover 4. This enables the removal of carbon monoxide from the modified gas B with a downsized unit and enables an increased yield of carbon monoxide (i.e., carbon monoxide removing efficiency. It is recommended to allow the PSA unit 3 to purify (to remove) unnecessary gases other than carbon monoxide by pressure swing between normal pressure and a high pressure as in Embodiment 4. It is also naturally possible that the adsorbent in the PSA unit 3 is regenerated under a reduced pressure.

(Modified Embodiments of Embodiment 6)

Embodiment 6 illustrates an embodiment in which the carbon monoxide remover 4 is composed of three carbon monoxide adsorption towers. The carbon monoxide remover 4 may also be composed of two, or four or more carbon monoxide adsorption towers, as in Embodiment 4. When there is no need of producing a high-purity hydrogen continuously over a long period of time, the carbon monoxide remover 4 may be composed of a single carbon monoxide adsorption tower, as in Embodiment 4.

Embodiment 6 illustrates an embodiment in which a compressor is arranged only upstream from the carbon monoxide remover 4. In addition, an extra compressor may be arranged between the PSA unit 3 and the carbon monoxide remover 4 to carry out an adsorption operation in the PSA unit 3 at a higher pressure than that in the carbon monoxide remover 4.

EXAMPLES

Experimental Example 1

Figure 9:
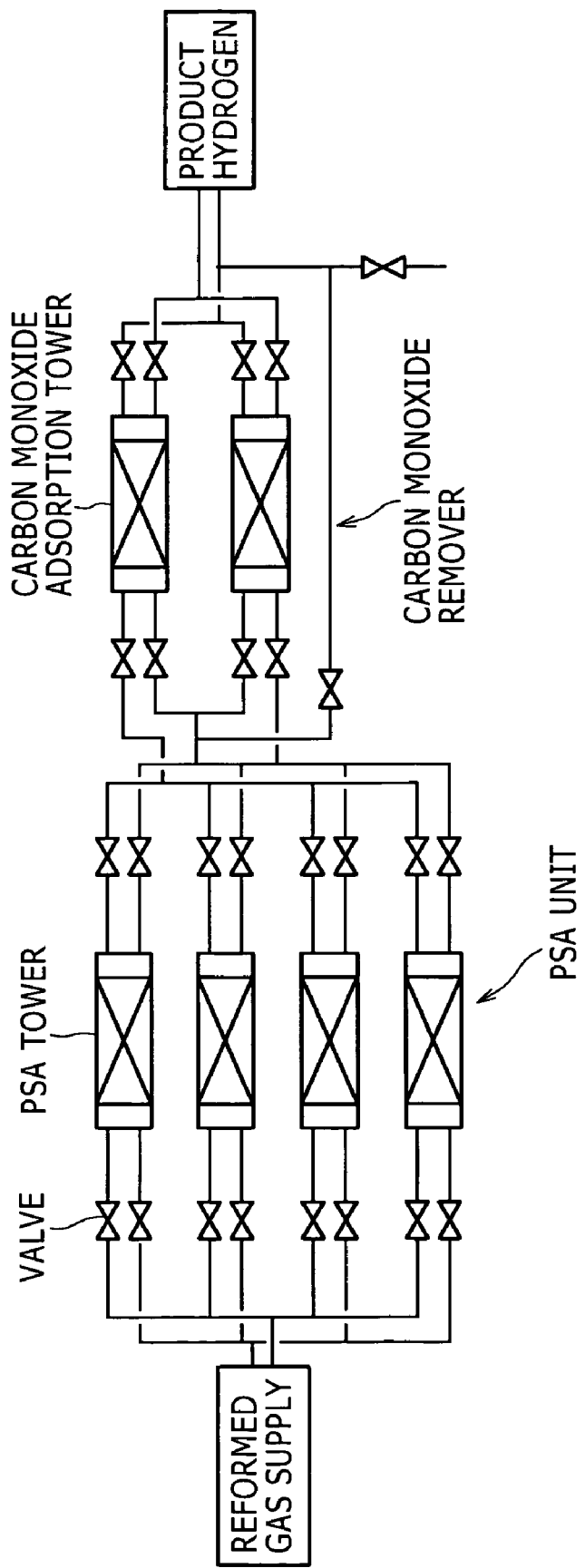
FIG. 9 is a flow chart schematically illustrating an experimental apparatus for hydrogen purification used in Experimental Example 1.

To verify advantages of Embodiments 1 to 4 according to the present invention, hydrogen purification experiments (high-purity hydrogen production experiments) were conducted using an experimental apparatus illustrated in FIG. 9. With reference to FIG. 9, this experimental apparatus is composed of a PSA unit and a carbon monoxide remover, in which the PSA unit includes four PSA towers, and the carbon monoxide remover includes two carbon monoxide adsorption towers. The experimental apparatus is configured to carry out a switching operation of gas passages and an operation of pressure rising/pressure reducing by the actions of valves arranged upstream and downstream of respective adsorption towers. A simulative reformed gas was prepared by admixing gases supplied from commercially available cylinders. The simulative reformed gas was introduced into the experimental apparatus at a pressure of 7 atmospheres (absolute pressure (hereinafter the same); 1 atmosphere equals 0.101325 MPa), and hydrogen purification experiments were conducted.

Initially, an operation in the PSA unit was conducted so that the reformed gas at a pressure of 7 atmospheres was circulated in any one of the PSA towers to remove $H_2O$, $CH_4$, and $CO_2$, and the reformed gas circulation was switched to another adsorption tower after the breakthrough of CO gas and before the breakthrough of $CH_4$ gas. The adsorption tower after the reformed gas circulation was reduced in pressure to 4 atmospheres, and a gas emitted during the process of pressure reduction was introduced into still another adsorption tower after the completion of regeneration by washing. The adsorption tower, whose pressure had been reduced to 4 atmospheres, was further reduced in pressure to 1 atmosphere, and the adsorption tower after the pressure reduction was washed with an offgas from a carbon monoxide adsorption tower to removed adsorbed components. The adsorption tower after washing was subjected to pressure rising to 4 atmospheres by introducing a gas discharged from another adsorption tower during pressure reduction, further to pressure rising to 7 atmospheres by charging hydrogen gas. Then, this adsorption tower was switched to the reformed gas circulation and thereby subjected to purification of hydrogen gas again. This cycle was cyclically repeated using four adsorption towers to thereby recover a carbon monoxide-containing hydrogen gas from the reformed gas.

In the carbon monoxide remover, a carbon monoxide-containing hydrogen gas recovered in the PSA unit was circulated in one of the two carbon monoxide adsorption towers to remove carbon monoxide, and a commercially available hydrogen gas was circulated in the other adsorption tower to wash and regenerate the adsorbent.

Hydrogen purification experiments were conducted under following conditions, and the ratio (hydrogen recovery) of the $H_2$ content in the recovered product hydrogen to the $H_2$ content in the reformed gas was determined.

Comparative Example

To simulate a conventional process for hydrogen purification using a PSA unit alone, a hydrogen purification experiment was conducted under the following conditions.

Reformed Gas Composition
$H_2$: 71%, $CH_4$: 1%, CO: 14%, $CO_2$: 9%, $H_2O$: 5%
Carbon Monoxide Adsorption Tower: The gas was bypassed and hydrogen was purified using PSA alone.
PSA Adsorbent: alumina, carbon molecular sieves, zeolite 5A Example 1

A hydrogen purification experiment was conducted under the following conditions to simulate an embodiment according to the present invention in which hydrogen purification is conducted using a PSA unit and a carbon monoxide remover.
Reformed Gas Composition
$H_2$: 71%, $CH_4$: 1%, CO: 14%, $CO_2$: 9%, $H_2O$: 5%
Carbon Monoxide Adsorbent: copper (I) chloride-supporting alumina
PSA Adsorbent: alumina, carbon molecular sieves Example 2

A hydrogen purification experiment was conducted under the following conditions to simulate an embodiment according to the present invention in which hydrogen purification is conducted using a dehumidifier, a PSA unit, and a carbon monoxide remover.
Reformed Gas Composition
$H_2$: 74%, $CH_4$: 1%, CO: 15%, $CO_2$: 10%, $H_2O$: 0%
Carbon Monoxide Adsorbent: copper(I) chloride-supporting alumina
PSA Adsorbent: carbon molecular sieves Experimental Results The experimental results are shown in Table 2. Comparative Example, in which hydrogen purification was conducted using not a carbon monoxide remover but a PSA unit alone, had a hydrogen recovery of 69%.

In contrast, Example 1 corresponding to an embodiment, in which a carbon monoxide remover is arranged downstream from a PSA unit, had a markedly increased hydrogen recovery of 78%. In addition, the total volume of adsorbents used in the PSA unit was reduced to 54% of that in Comparative Example, because the load of purification in the PSA unit was reduced.

Example 2 corresponding to an embodiment, in which a dehumidifier is further arranged upstream from the PSA unit, had a further increased and very high hydrogen recovery of 80%. In addition, the total volume of adsorbents used in the PSA unit was reduced to 44% of that in Comparative Example, because there was no need of using alumina.

These results demonstrate that the hydrogen recovery can be markedly improved and the PSA unit can be significantly downsized by arranging a carbon monoxide remover composed of carbon monoxide adsorption towers downstream from the PSA unit in reformed gas purification.

TABLE 2

| | CO adsorption tower | $H_2O$ concentration in reformed gas (% by volume) | PSA adsorbent | Hydrogen recovery (%) |
|---|---|---|---|---|
| Comparative Example | no | 5 | alumina/CMS*/zeolite | 69 |
| Example 1 | yes | 5 | alumina/CMS* | 78 |
| Example 2 | yes | 0 | CMS* | 80 |

*CMS = Carbon molecular sieves

Experimental Example 2

Figure 10:
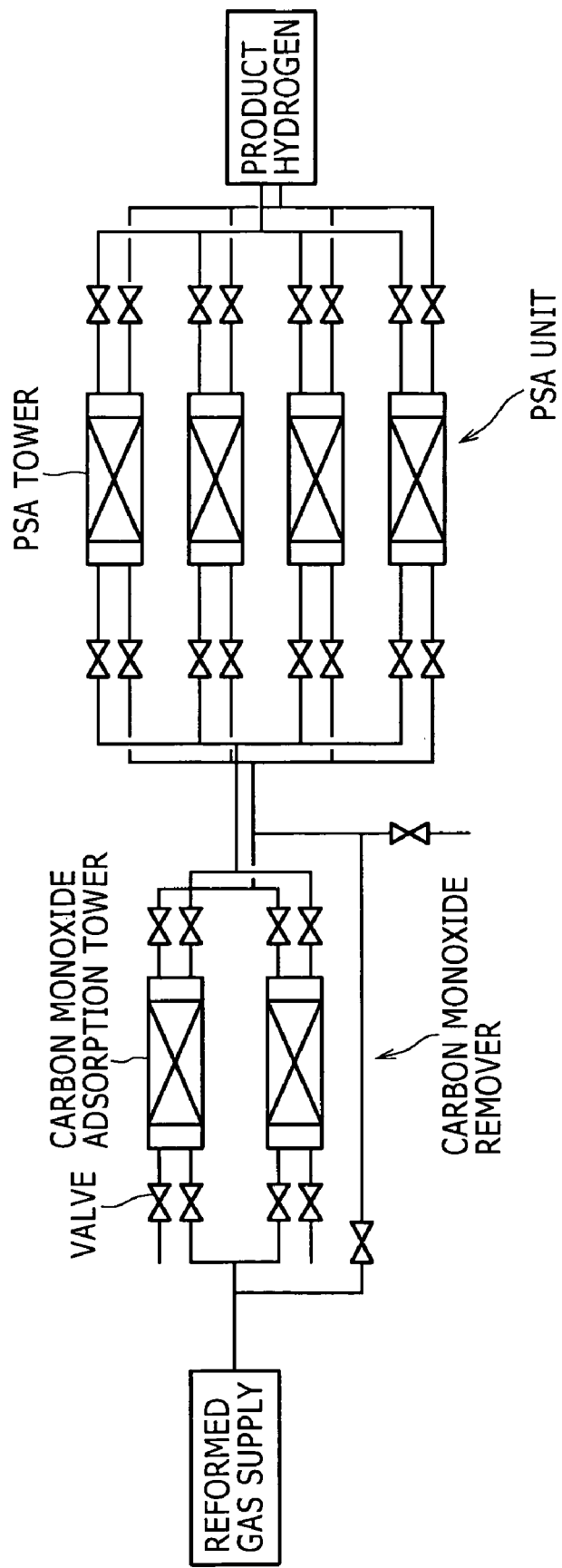
FIG. 10 is a flow chart schematically illustrating an experimental apparatus for hydrogen purification used in Experimental Example 2.

To verify advantages of Embodiments 5 and 6 according to the present invention, hydrogen purification experiments (high-purity hydrogen production experiments) were conducted using an experimental apparatus illustrated in FIG. 10. With reference to FIG. 10, this experimental apparatus is composed of a PSA unit and a carbon monoxide remover, in which the PSA unit includes four PSA towers, and the carbon monoxide remover includes two carbon monoxide adsorption towers, as in Experimental Example 1. The experimental apparatus is configured to perform a switching operation of gas passages and an operation of pressure rising/pressure reducing by the actions of valves arranged upstream and downstream of respective adsorption towers. A simulative reformed gas was prepared by admixing gases from commercially available cylinders. The simulative reformed gas was introduced into the experimental apparatus at a pressure of 7 atmospheres (absolute pressure (hereinafter the same); 1 atmosphere equals 0.101325 MPa), and hydrogen purification experiments were conducted.

Initially, in the carbon monoxide remover, the reformed gas at 7 atmospheres was circulated in one of the two carbon monoxide adsorption towers to remove carbon monoxide, and an offgas (PSA tower offgas) after the regeneration of the after-mentioned PSA tower was circulated to regenerate the adsorbent by washing.

In the PSA unit, an operation was conducted so that a gas (carbon monoxide-removed gas) at 7 atmospheres after the removal of carbon monoxide by adsorption in the carbon monoxide remover was circulated in any of the PSA towers to remove $H_2O$, $CH_4$, and $CO_2$, and the gas circulation was switched to another adsorption tower before these unnecessary gas components reached breakthrough. The adsorption tower after the carbon monoxide-removed gas circulation was reduced in pressure to 4 atmospheres, and a gas emitted during the process of pressure reduction was introduced into still another adsorption tower after the completion of regeneration by washing. The adsorption tower, whose pressure had been reduced to 4 atmospheres, was further reduced in pressure to 1 atmosphere, and the adsorption tower after the pressure reduction was washed with a recovered product hydrogen to remove adsorbed components. The adsorption tower after washing was subjected to pressure rising to 4 atmospheres by introducing a gas discharged from another adsorption tower during pressure reduction, and further to pressure rising to 7 atmospheres by charging hydrogen gas. Then, this adsorption tower was switched to the reformed gas circulation and thereby subjected to purification of hydrogen gas again. This cycle was cyclically repeated using four adsorption towers to thereby recover a carbon monoxide-containing hydrogen gas from the reformed gas.

Hydrogen purification experiments were conducted under following conditions, and the ratio (hydrogen recovery) of the $H_2$ content in the recovered product hydrogen to the $H_2$ content in the reformed gas was determined.

Comparative Example

To simulate a conventional process of carrying out hydrogen purification using a PSA unit alone, a hydrogen purification experiment was conducted under the following conditions as in Experimental Example 1.
Reformed Gas Composition
  $H_2$: 71%, $CH_4$: 1%, CO: 14%, $CO_2$: 9%, $H_2O$: 5%
Carbon Monoxide Adsorption Tower: The gas was bypassed and hydrogen was purified using PSA alone.
PSA Adsorbent: alumina, carbon molecular sieves, zeolite 5A

Example 1

A hydrogen purification experiment was conducted under the following conditions to simulate an embodiment according to the present invention in which hydrogen purification is conducted using a PSA unit and a carbon monoxide remover.
Reformed Gas Composition
  $H_2$: 71%, $CH_4$: 1%, CO: 14%, $CO_2$: 9%, $H_2O$: 5%
Carbon Monoxide Adsorbent: copper(I) chloride-supporting alumina
PSA Adsorbent: alumina, carbon molecular sieves

Example 2

A hydrogen purification experiment was conducted under the following conditions to simulate an embodiment according to the present invention in which hydrogen purification is conducted using a dehumidifier, a PSA unit, and a carbon monoxide remover.
Reformed Gas Composition
  $H_2$: 74%, $CH_4$: 1%, CO: 15%, $CO_2$: 10%, $H_2O$: 0%
Carbon Monoxide Adsorbent: copper(I) chloride-supporting alumina
PSA Adsorbent: carbon molecular sieves

Experimental Results

The experimental results are shown in Table 3. Comparative Example, in which hydrogen purification was conducted using not a carbon monoxide remover but a PSA unit alone, had a hydrogen recovery of 69%.

In contrast, Example 1 corresponding to an embodiment, in which a PSA unit is arranged downstream from a carbon monoxide remover, had a markedly increased hydrogen recovery of 81%. In addition, the total volume of adsorbents used in the PSA unit was reduced to 51% of that in Comparative Example, because the load of purification in the PSA unit was reduced.

Example 2 corresponding to an embodiment, in which a dehumidifier is further arranged upstream of the carbon monoxide remover, had a further increased and very high hydrogen recovery of 84%. In addition, the total volume of adsorbents used in the PSA unit was reduced to 42% of that in Comparative Example, because there was no need of using alumina.

These results demonstrate that the hydrogen recovery can be markedly improved and the PSA unit can be significantly downsized by arranging a carbon monoxide remover composed of carbon monoxide adsorption towers upstream from the PSA unit in reformed gas purification.

TABLE 3

| | CO adsorption tower | $H_2O$ concentration in reformed gas (% by volume) | PSA adsorbent | Hydrogen recovery (%) |
|---|---|---|---|---|
| Comparative Example | no | 5 | alumina/CMS*/zeolite | 69 |
| Example 1 | yes | 5 | alumina/CMS* | 81 |
| Example 2 | yes | 0 | CMS* | 84 |

*CMS = Carbon molecular sieves

The invention claimed is:

1. A method of producing high-purity hydrogen, comprising the steps of:
   (a) reforming a reformable raw material to yield a hydrogen-rich reformed gas as a reforming step;
   (b) allowing the reformed gas to pass through a pressure swing adsorption (PSA) tower having a PSA adsorbent to remove unnecessary gases by adsorption to thereby yield a carbon monoxide-containing hydrogen gas in an unnecessary gas removing step; and
   (c) removing carbon monoxide from said carbon monoxide-containing hydrogen gas as a carbon monoxide removing step by passing said carbon monoxide-containing hydrogen gas through a carbon monoxide adsorption tower packed with an adsorbent selective for carbon monoxide and which removes carbon monoxide by a selective adsorption yielding a high-purity hydrogen,
   wherein said adsorbent selective for carbon monoxide of said carbon monoxide adsorption tower is different from said PSA adsorbent, and
   wherein the adsorbent selective for carbon monoxide is a material comprising a support, and (i) a copper(I) halide and/or (ii) a copper(II) halide supported on the support, or is a reduced product of (i) the copper(I) halide and/or (ii) the copper(II) halide, and wherein the support is at least one support selected from the group consisting of silica, alumina, activated carbon, graphite, and a styrenic resin.

2. The method of producing high-purity hydrogen according to claim 1, further comprising step (d) compressing the carbon monoxide-containing hydrogen gas, produced in step (b) using a compressor.

3. The method of producing high-purity hydrogen according to claim 1, further comprising step (e) removing moisture from the reformed gas using an adsorptive dehumidifier as a dehumidifying step between step (a) the reforming step and step (b) allowing the reformed gas to pass through the pressure swing adsorption tower step.

4. The method of producing high-purity hydrogen according to claim 1, wherein the reforming step is any one of the following steps (f) to (j):
   (f) reforming the reformable raw material with steam to yield a hydrogen-rich reformed gas;
   (g) reforming the reformable raw material with steam and converting the reformed raw material to yield a hydrogen-rich reformed gas;
   (h) reforming a hydrocarbon-containing fuel through partial oxidation to yield a hydrogen-rich reformed gas;
   (i) reforming a hydrocarbon-containing fuel through partial oxidation while simultaneously reforming the hydrocarbon-containing fuel with steam to yield a hydrogen-rich reformed gas; and
   (j) reforming a hydrocarbon-containing fuel with steam and allowing the reformed hydrocarbon-containing fuel to pass through a crude separation membrane such as a ceramic filter to have an increased hydrogen concentration to thereby yield a hydrogen-rich reformed gas.

5. The method of producing high-purity hydrogen according to claim 1, wherein the unnecessary gas removing step comprises the steps of removing unnecessary gases other than carbon monoxide by adsorption as an unnecessary gas adsorbing step; and regenerating a PSA adsorbent packed in the PSA tower as a PSA adsorbent regenerating step, and wherein the carbon monoxide removing step comprises the steps of removing carbon monoxide by adsorption as a carbon monoxide adsorbing step; and regenerating an adsorbent for carbon monoxide as a carbon monoxide adsorbent regenerating step.

6. The method of producing high-purity hydrogen according to claim 5, wherein the carbon monoxide removing step is carried out using a carbon monoxide remover comprising two or more carbon monoxide adsorption towers each packed with the carbon monoxide adsorbent, wherein the carbon monoxide adsorbing step and the carbon monoxide adsorbent regenerating step are carried out alternately in each one carbon monoxide adsorption tower, and wherein the carbon monoxide adsorbing step is carried out in at least one carbon monoxide adsorption tower at any optional time.

7. The method of producing high-purity hydrogen according to claim 5, wherein the carbon monoxide adsorbent regenerating step comprises allowing a part of the high-purity hydrogen to pass through the carbon monoxide adsorption tower to regenerate the carbon monoxide adsorbent.

8. The method of producing high-purity hydrogen according to claim 7, wherein a carbon monoxide adsorption tower offgas is used as a raw material for shift reaction in the reforming step, wherein the carbon monoxide adsorption tower offgas has been exhausted from the carbon monoxide adsorption tower in the carbon monoxide adsorbent regenerating step.

9. The method of producing high-purity hydrogen according to claim 7, wherein a carbon monoxide adsorption tower offgas is used as a purge gas in the PSA adsorbent regenerating step, wherein the carbon monoxide adsorption tower offgas has been exhausted from the carbon monoxide adsorption tower in the carbon monoxide adsorbent regenerating step.

10. The method of producing high-purity hydrogen according to claim 9, wherein a PSA tower offgas is used as a fuel for producing a reformed gas in the reforming step, wherein the PSA tower offgas has been exhausted from the PSA tower in the PSA adsorbent regenerating step.

11. The method of producing high-purity hydrogen according to claim 9, wherein combustion heat of the PSA offgas and/or sensible heat of the reformed gas is used as heat for regenerating the carbon monoxide adsorbent in the carbon monoxide adsorbent regenerating step, wherein the PSA offgas has been exhausted from the PSA tower in the PSA adsorbent regenerating step.

12. The method of producing high-purity hydrogen according to claim 5, wherein the PSA adsorbent regenerating step comprises allowing a part of the high-purity hydrogen to pass through the PSA tower to regenerate the PSA adsorbent.

13. The method of producing high-purity hydrogen according to claim 12, wherein the carbon monoxide adsorbent regenerating step comprises allowing a PSA tower offgas to pass through the carbon monoxide adsorption tower to regenerate the carbon monoxide adsorbent, and wherein the PSA tower offgas has been exhausted from the PSA tower in the PSA adsorbent regenerating step.

14. The method of producing high-purity hydrogen according to claim 12, wherein the PSA adsorbent regenerating step comprises allowing a PSA tower offgas as a primary purge gas and a part of the high-purity hydrogen as a secondary purge gas to sequentially pass through the carbon monoxide adsorption tower to regenerate the carbon monoxide adsorbent, and wherein the PSA tower offgas has been exhausted from the PSA tower in the PSA adsorbent regenerating step.

15. The method of producing high-purity hydrogen according to claim 13, wherein a carbon monoxide adsorption tower offgas and/or a PSA tower offgas is used as a fuel for producing a reformed gas in the reforming step, wherein the carbon monoxide adsorption tower offgas has been exhausted from the carbon monoxide adsorption tower in the carbon monoxide adsorbent regenerating step, and wherein the PSA tower offgas has been exhausted from the PSA tower in the PSA adsorbent regenerating step.

16. The method of producing high-purity hydrogen according to claim 13, wherein combustion heat of a carbon monoxide adsorption tower offgas, combustion heat of a PSA tower offgas, sensible heat of the reformed gas, or two or more of these are used as heat for heating the carbon monoxide adsorbent in the carbon monoxide adsorbent regenerating step, wherein the carbon monoxide adsorption tower offgas has been exhausted from the carbon monoxide adsorption tower in the carbon monoxide adsorbent regenerating step, and wherein the PSA tower offgas has been exhausted from the PSA tower in the PSA adsorbent regenerating step.

17. The method of producing high-purity hydrogen according to claim 12, wherein a PSA tower offgas is used as a purge gas in the carbon monoxide adsorbent regenerating step, wherein the PSA tower offgas has been exhausted from the PSA tower in the PSA adsorbent regenerating step.

18. The method of producing high-purity hydrogen according to claim 17, wherein a carbon monoxide adsorption tower offgas is used as a fuel for producing a reformed gas in the reforming step, wherein the carbon monoxide adsorption tower offgas has been exhausted from the carbon monoxide adsorption tower in the carbon monoxide adsorbent regenerating step.

19. The method of producing high-purity hydrogen according to claim 17, combustion heat of a carbon monoxide adsorption tower offgas and/or sensible heat of the reformed gas is used as heat for regenerating the carbon monoxide adsorbent in the carbon monoxide adsorbent regenerating step, wherein the carbon monoxide adsorption tower offgas has been exhausted from the carbon monoxide adsorption tower in the carbon monoxide adsorbent regenerating step.

20. The method of producing high-purity hydrogen according to claim 14, wherein a carbon monoxide adsorption tower offgas and/or a PSA tower offgas is used as a fuel for producing a reformed gas in the reforming step, wherein the carbon monoxide adsorption tower offgas has been exhausted from the carbon monoxide adsorption tower in the carbon monoxide adsorbent regenerating step, and wherein the PSA tower offgas has been exhausted from the PSA tower in the PSA adsorbent regenerating step.

21. The method of producing high-purity hydrogen according to claim 14, wherein combustion heat of a carbon monoxide adsorption tower offgas, combustion heat of a PSA tower offgas, sensible heat of the reformed gas, or two or more of these are used as heat for heating the carbon monoxide adsorbent in the carbon monoxide adsorbent regenerating step, wherein the carbon monoxide adsorption tower offgas has been exhausted from the carbon monoxide adsorption tower in the carbon monoxide adsorbent regenerating step, and wherein the PSA tower offgas has been exhausted from the PSA tower in the PSA adsorbent regenerating step.

22. The method of producing high-purity hydrogen according to claim 6, wherein the carbon monoxide removing step is carried out using a carbon monoxide remover comprising three or more carbon monoxide adsorption towers each packed with the carbon monoxide adsorbent, and wherein the following steps (1) and (2) are repeated in the carbon monoxide removing step:
(1) carrying out the carbon monoxide adsorbent regenerating step in any one carbon monoxide adsorption tower, and carrying out the carbon monoxide adsorbing step in the other carbon monoxide adsorption towers, wherein the other carbon monoxide adsorption towers are connected in series; and
(2) separating a carbon monoxide adsorption tower which is farthest upstream of the series-connected carbon monoxide adsorption towers from the series connection and connecting to the series connection a carbon monoxide adsorption tower which is farthest downstream, after the completion of the carbon monoxide adsorbent regenerating step.

23. A method of producing high-purity hydrogen, comprising the steps of:
reforming a reformable raw material to yield a hydrogen-rich reformed gas as a reforming step;
removing carbon monoxide from said reformed gas as a carbon monoxide removing step by passing said reformed gas through a carbon monoxide adsorption tower packed with an adsorbent selective for carbon monoxide and which removes carbon monoxide by selective adsorption yielding a carbon monoxide-removed gas;
compressing the carbon monoxide-removed gas using a compressor to yield a compressed gas as a gas compressing step; and
allowing the compressed gas to pass through a PSA tower having a PSA adsorbent to remove unnecessary gases by adsorption yielding a high-purity hydrogen in an unnecessary gas removing step,
wherein said adsorbent selective for carbon monoxide of said carbon monoxide adsorption tower is different from said PSA adsorbent, and
wherein the adsorbent selective for carbon monoxide is a material comprising a support, and (i) a copper(I) halide and/or (ii) a copper(II) halide supported on the support, or is a reduced product of (i) the copper(I) halide and/or the (ii) copper(II) halide, and wherein the support is at least one support selected from the group consisting of silica, alumina, activated carbon, graphite, and a styrenic resin.

24. The method of producing high-purity hydrogen according to claim 23, further comprising the step of compressing the reformed gas using a compressor as a reformed gas compressing step, instead of or in addition to the carbon monoxide-removed gas compressing step, between the reforming step and the carbon monoxide removing step.

25. The method of producing high-purity hydrogen according to claim 23, further comprising the step of removing moisture from the reformed gas using an adsorptive dehumidifier as a dehumidifying step between the reforming step and the carbon monoxide removing step.

* * * * *